United States Patent [19]

Vinal

[11] 3,978,319

[45] Aug. 31, 1976

[54] UNIVERSAL SELF-CLOCKING CODE READING METHOD AND APPARATUS

[75] Inventor: Albert Watson Vinal, Cary, N.C.

[73] Assignee: International Business Machines Corporation, Armonk, N.Y.

[22] Filed: Oct. 29, 1975

[21] Appl. No.: 626,680

[52] U.S. Cl. .......................... 235/61.11 E; 250/555
[51] Int. Cl.² ...................... G06K 7/10; G08C 9/06
[58] Field of Search ............. 235/61.11 E, 61.11 D, 235/61.12 N, 61.12 M; 250/555, 566, 568, 569; 340/146.32

[56] References Cited
UNITED STATES PATENTS

| | | | |
|---|---|---|---|
| 3,761,685 | 9/1973 | Alpert et al. | 235/61.11 E |
| 3,784,792 | 1/1974 | Dobras | 235/61.11 E |
| 3,838,251 | 9/1974 | Herrin | 235/61.11 E |
| 3,882,464 | 5/1975 | Zamkow | 235/61.11 E |
| 3,947,662 | 3/1976 | Vinal | 235/61.11 E |

*Primary Examiner*—Daryl W. Cook
*Attorney, Agent, or Firm*—Edward H. Duffield

[57] ABSTRACT

A general method for reading or decoding the self-clocking encoded data content of digital data bits, which may be recorded on magnetic or optical media or received on a communication channel in an encoded electrical signal form, is described. The method is useful for decoding all self-clocking codes where signals in the form of optic, magnetic, or electric signal variations are presented to a decoding apparatus for the extraction of data content therefrom. The technique utilizes a standard reference length, or alternatively, a set of transitions placed outside of each series of coded data bits or characters to provide a reference length, and then predicts, for the known type of code format, each possible location for each next valid data pulse or signal transition. Search gates segmenting the search time are erected about the predicted valid locations for the pulses for the next data bit and, depending upon in which gate or search window each pulse is found, the data content of that bit cell is defined in accordance with a logical table or matrix of values corresponding to the code format being utilized.

23 Claims, 31 Drawing Figures

FIG. 2A
DELTA DISTANCE CODE
(SAME WIDTH=1, DIFF. WIDTH=0)  p=1

| DPI→<br>CPI↓ | 2 | 3 | 4 |
|---|---|---|---|
| 2 | 1,1 | 1,0 | |
| 3 | 0,1 | 0,0 | 0,1 |
| 4 | | 1,0 | 1,1 |

FIG. 2B
S2S $\begin{cases} S=1 \\ 2S=0 \end{cases}$  p=1

| DPI→<br>CPI↓ | 2 | 3 | 4 |
|---|---|---|---|
| 2 | 1,1 | 1,0<br>A | |
| 3 | 1,1<br>B | A=1,0<br>B=0,1 | 0,0<br>A |
| 4 | IIC<br>USE FIG.<br>2-A | 0,1<br>B | 0,0 |

FIG. 2C
S2S $\begin{cases} S=0 \\ 2S=1 \end{cases}$  p=1

| DPI→<br>CPI↓ | 2 | 3 | 4 |
|---|---|---|---|
| 2 | 0,0 | 0,1<br>A | |
| 3 | 0,0<br>B | A=0,1<br>B=1,0 | 1,1<br>A |
| 4 | IIC<br>USE FIG.<br>2-B | 1,0<br>B | 1,1 |

FIG. 2D
F2F DECODE METHOD #1
(SYMBOL BOUNDRY POLARITY COMPARISON)  p=1

| DPI→<br>CPI↓ | 2 | 3 | 4 |
|---|---|---|---|
| 2 | 1 | 1,0 | BIC<br>START AT<br>DATA |
| 3 | 1 | 0 | 0,0 |
| 4 | BIC<br>END OF<br>DATA | 0 | 0,0 |

FIG. 2E
F2F DECODE METHOD #2
(CENTER PULSE DETECTION)  p=1

| DPI→<br>CPI↓ | 2 | 3 | 4 |
|---|---|---|---|
| 2 | 1 | 0 | |
| 3 | 1 | 0,1 | 0,0 |
| 4 | | 0,1 | 0,0 |

FIG. 3
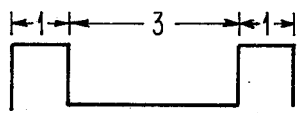

FIG. 6A
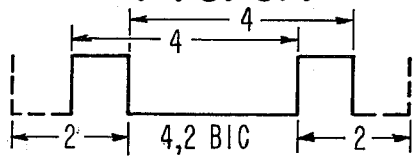

FIG. 6B

BAR CODE ELEMENT SET PHYSICAL CHARACTERISTICS

FIG. 8

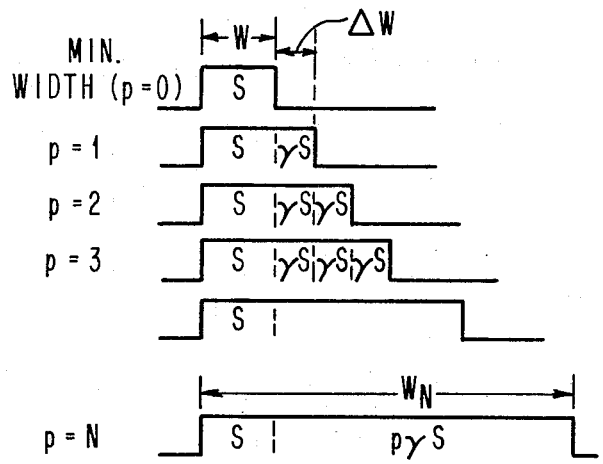

IN GENERAL: IF p IS INCREMENTAL AND NO SKIP OCCURS:

$$W_N = S + p\gamma S, \quad 0 \leq p \leq N$$

$\gamma$ = LOWEST DETECTABLE OR USEFUL UNIT OF INCREASE IN WIDTH - ie $\gamma$ IS MIN. UNIT OF INCREASE IN WIDTH.

∴ $\gamma$ TIMES THE MIN. WIDTH OF A BAR = MIN. AMOUNT OF WIDTH INCREASE. $\Delta W = \gamma S$

FIG. 9

A SELF CLOCKING CODE - COMBINATIONS OF 2 WIDTHS = CODE SET

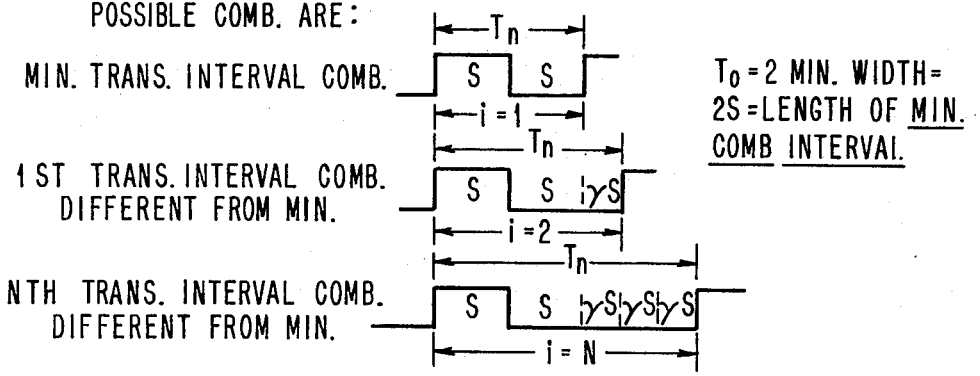

$T_0$ = 2 MIN. WIDTH = 2S = LENGTH OF MIN. COMB INTERVAL.

WHERE i = INDEX # OF <u>INTERVAL</u> BETWEEN <u>TWO LIKE POLARITY PULSES</u> WHICH IS REALLY THE COMBINED INTERVAL OF ANY TWO CODE ELEMENT WIDTHS.

(LENGTH) $T_N = 2S + (i_n - 1)\gamma S$

<u>ONLY IF</u> NO INCREMENTAL VALUE HAS <u>DIFFERENT</u> $\gamma$ FOR $1 < i \leq N$ ie. $\Delta W$ = CONST.

THIS CAN BE WRITTEN IN TERMS OF p ALONE $p_{MAX} = \frac{i_{MAX} - 1}{2}$ SINCE $i_{MAX} = 2p + 1$. BUT i STILL IS USED TO DEFINE THE INTERVAL #, SINCE FOR p=1 (FOR EXAMPLE) 3 INTERVALS CAN BE GENERATED FOR $T_n$ AND NO SPECIFIC COMBINED LENGTH IS DEFINED BY p ALONE.

| FIG. 10A | FIG. 10B | FIG. 10C |
|---|---|---|

FIG. 11

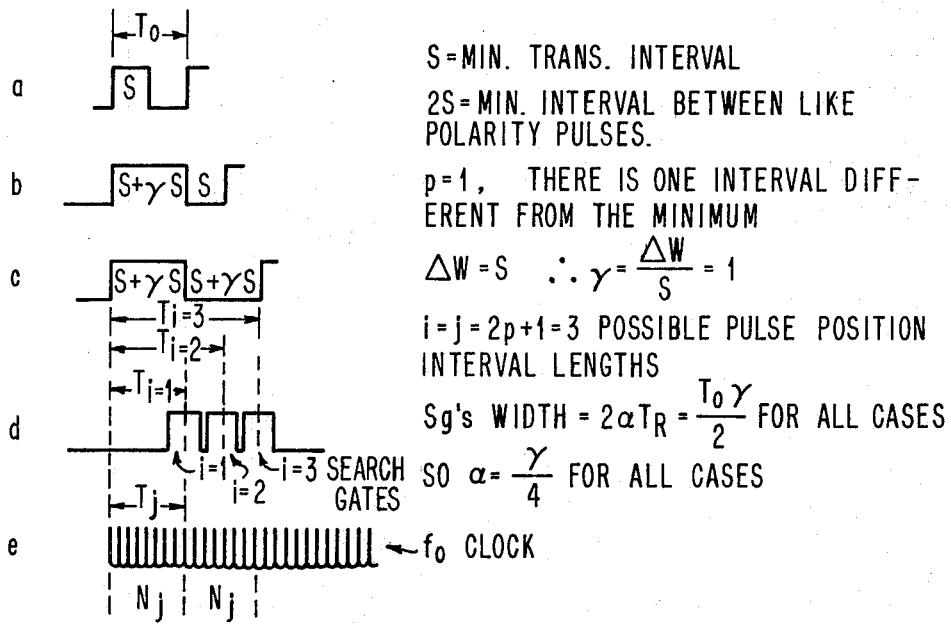

a  S=MIN. TRANS. INTERVAL
   2S=MIN. INTERVAL BETWEEN LIKE POLARITY PULSES.

b  p=1, THERE IS ONE INTERVAL DIFFERENT FROM THE MINIMUM $\Delta W = S \quad \therefore \gamma = \frac{\Delta W}{S} = 1$ c  i=j=2p+1=3 POSSIBLE PULSE POSITION INTERVAL LENGTHS Sg's WIDTH = $2\alpha T_R = \frac{T_0 \gamma}{2}$ FOR ALL CASES d  SO $\alpha = \frac{\gamma}{4}$ FOR ALL CASES e  $f_0$ CLOCK $f_j T_j = N = T_i f_i = T_1 f_1 = T_2 f_2 = T_3 f_3$

N DESIRED ≥ 100 (APPROX.)

NOW $T_i = T_0 [R]$  AND $f_i = \frac{N}{t_i}$

AND $T_0 = T_i$ FOR $i = 1$

AND IN GEN. $T_i f = N_i$ $T_0 f_0 = N_0$ $f_0 = \frac{N}{T_0}$

BUT $\frac{T_i}{T_0} = R$ AND $\frac{T_i}{T_0} = \frac{f_0}{f_i}$ $\therefore f_i = \frac{f_0}{R}$ WIDTH OF $n^{th}$ INTERVAL:

$T_{n(i,j,\gamma)} = T_{0(j,\gamma)} [B_{(i,j,\gamma)} \pm \alpha_{(j,\gamma)}]$ WHERE: $\alpha_{(j,\gamma)} = \frac{\gamma}{2[2-\gamma+j\gamma]}$ AND $T_{0(j,\gamma)} = T_0 \left[ \frac{2-\gamma+j\gamma}{2} \right]$ $\therefore$ THE PRODUCT $[2T_{0(j,\gamma)}][\alpha_{(j,\gamma)}]$ = SG WINDOW WIDTH ie $2T_0 \alpha = \frac{2T_0 \gamma}{4} = T_0 \frac{\gamma}{2} \therefore \alpha = \frac{\gamma}{4}$

FIG. 12 a. ⎍S⎍   MIN. INTERVAL ELEMENT b. ⎍S|S⎍   MIN. TRANS. CODE INTERVAL
   ├─T₀─┤
   ΔW c. ⎍S|Sγ⎍   NEXT SIZE ELEMENT = S + γS
              OR d. ⎍S(1+γ)⎍   NEXT SIZE ELEMENT = S(1+γ)

e. ⎍S(1+γ)|S⎍
   ├─i=2─┤ f. ⎍S|S(1+γ)⎍
   ├─i=2─┤
   ├─T₀─┤ g. ⎍S|S|γS⎍
   ├─i=1─┤ h. ⎍S(1+γ)|S(1+γ)⎍
   ├─i=3─┤

DRAWN FOR γ = 1
ie. $\frac{\Delta W}{S} = 1$
OR ΔW = S
SO γ = 1 BY DEF.

COMBINED ELEMENTS GENERATE POSSIBLE VALID PULSE POSITIONS 1, 2, 3

NOW SG WINDOW WIDTH ALWAYS = $2\alpha T_n$
AND IT CAN BE SHOWN THAT $\alpha = \gamma/4$
ALWAYS, SO THE LENGTH OF AN INTERVAL $T_n$ CAN BE MEASURED IN $\alpha$ UNITS.

EXAMPLE: SG WIDTH = $2\alpha T_n$

AND $\alpha = \gamma/4$, SO
$\gamma/2 \, T_n$ = SG WIDTH
$\gamma T_n$ = 2 SG WIDTH
$T_n = 2SG/\gamma$
AND FOR $\alpha = 1$,
$T_n$ = 2 SG's ∴ $T_n = 4\alpha$ UNITS BUT SINCE $T_n = 4\alpha$ FOR ALL CASES
START SG1 AT $3/4 \, T_n = 3\alpha$ UNITS
END SG1, START SG2 AT $5/4 \, T_n = 5\alpha$ UNITS
END SG2, START SG3 AT $7/4 \, T_n = 7\alpha$ UNITS
END SG3, etc. AT $9/4 \, T_n = 9\alpha$ FOR ALL CASES.

FIG. 14
 = ELEMENT #1
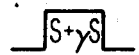 = ELEMENT #2
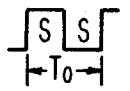 POSSIBLE VALID 2 ELEMENT COMBINATIONS CONTROL DATA INTERVALS
a. 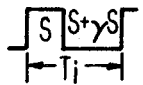
b. 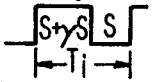
c. 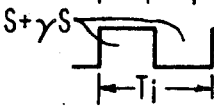
d.
e. 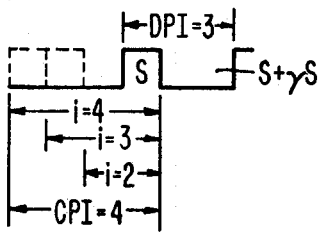
f. 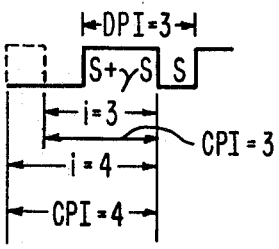

FIG. 18A
| DPI→<br>CPI ↓ | 2 | 3 | 4 |
|---|---|---|---|
| 1 | 1 | 1,0 | |
| 2 | | 0 | 0,0 |
F2F # 1
FIG. 18B
| DPI→<br>CPI ↓ | 2 | 3 | 4 |
|---|---|---|---|
| 1 | 1 | 0 | |
| 2 | | 0,1 | 0,0 |
F2F # 2
FIG. 18C
| DPI→<br>CPI ↓ | 2 | 3 | 4 |
|---|---|---|---|
| 1 | 1,1 | 1,0 | |
| 2 | | 0,1 | 0,0 |
S2S { S = 1, 2S = 0 }
FIG. 18D
| DPI→<br>CPI ↓ | 2 | 3 | 4 |
|---|---|---|---|
| 1 | B 0,1<br>A 1,1 A | B 0,0<br>A 1,0 B | |
| 2 | | B 1,0<br>A 0,0 B | B 1,1<br>A 0,1 B |
DELTA DISTANCE
SAME = 1
DIFF = 0
1/3, 2/3 CODE
 = "0"
 = "1"
FIG. 18E
| DPI→<br>CPI ↓ | 2 | 3 | 4 |
|---|---|---|---|
| 2 | | 1 B | |
| 3 | | B = 1<br>A = 0 | |
| 4 | | 0 A | |

1

UNIVERSAL SELF-CLOCKING CODE READING METHOD AND APPARATUS

FIELD OF THE INVENTION

This invention relates to bar or signal transition codes and to code reading techniques and apparatus in general. More specifically, it relates to the self-clocking code reading or decoding techniques and apparatus useful for reading F2F, delta distance, phase shift, S2S and other self-clocking codes.

PRIOR ART

Numerous techniques and devices have previously been developed for the purpose of decoding self-clocking bar or transition signal codes, whether they be of the optic, magnetic, or electric signal processing type. The techniques have generally been tailored specifically for the type of self-clocking code to be decoded. In fact, the technique of decoding and the formats of the code used have been so specific that individual names have been associated with each of the various kinds of codes and with the decoding techniques therefor. However, a generalized technique compatible with all of the known self-clocking code formats and capable of successfully decoding each of them has not heretofore been developed.

Many of the prior art techniques involve steps of measuring or detecting specific signals and/or a distance incorporated in the code to derive clock signals, synchronization information, and data. One approach for a specific bar code but which could be a general code reading technique, utilizes a leading edge to leading edge and trailing edge to trailing edge measurement for the bars in the code and then defines the data content of the code according to the relative sizes of the measurements as compared to a reference distance or measurement contained in each code character. Such a technique may be found, for example, in U.S. Pat. No. 3,723,710. However, the technique set for there requires a reference distance or spacing to be incorporated in each string of code bits or in each character, and all of the spacings in the code string or in each character must be measured and then compared to find out which of the spacings is the reference. The remaining measurements are then compared against the reference to categorize the leading to leading edge distances in terms of the reference and the trailing to trailing edge distances in terms of the reference so that the code may be decoded.

This is a powerful technique, but is has several undesirable features. First, the entire sequence of code transitions, however long, must be scanned and measured first, then the reference spacing or measurement must be isolated from among the group of measurements; then the remaining measurements must be categorized in terms of the reference, and finally the data may be decoded in accordance with the relative measurements discovered. This technique is subject to accelerative or other types of frequency distortion in the basic signal input so that, particularly over long strings of data bits, the relative sizes of the transitions or spacings may become distorted sufficiently that some confusion as to the actual sizes as compared to a reference or even the identity of the reference spacing itself may occur. Secondly, the technique requires that all of the spacings must be measured first and processed later. If a transition is missed, its absence is not detected until the time when the processing occurs. It would be more advantageous to detect errors at the bit level or pulse level as soon as they occur, i.e., if a spacing measurement is missed or an edge transition is missed, it is desirable to know that at once, but this has not been provided in the aforementioned patent.

Various techniques have been developed for isolating data pulses from the data cells and/or from clock pulse spacings in various types of code streams such as F2F and phase shift codes. In general, these techniques involve setting up a search gate at an appropriate time to look for the pulse which is indicative of the data content of the bit cell. Some of these techniques are quite powerful but are limited to a specific type of code being decoded. Examples may be found in U.S. Pat. Nos. 3,723,710 and 3,708,748 and 3,886,521 as representative examples only, or in my copending application Ser. Nos. 522,210 538,272, 546,572 and 546,852. These techniques have not, as mentioned, been applied to, nor are they applicable to, other types of codes than those which they are specifically adapted to read.

Some of the code reading techniques in the prior art utilize a reference measurement, character, or set of transitions prior to each and every separate string of data bits. See for example, U.S. Pat. Nos. 3,711,843 or 3,750,108, or my aforementioned copending applications. However, as is noted in my aforementioned copending applications, placing a reference character at the front or leading portion of a long stream of data bit transitions is not as effective when the remaining bits are subject to distortion errors as non-constant scanning velocities or transmission frequency variations occur. In fact, the accelerative type of distortion errors can grow so great in hand scanning applications that the width (or spacing) between succeeding bits grows smaller and smaller (or conversely larger and larger) with increasing (or decreasing) scanner speed, respectively, until confusion as to which spacing may be the actual reference spacing, in such codes as contain a spacing within them, or other difficulties in isolating the data in clock pulses may occur.

In my aforementioned copending applications, certain predictive techniques are set forth for the F2F code in which the various data bits as they are encountered can be utilized as reference widths, in the case of binary 1, for the succeeding data bits as they are encountered. This provides a good deal of corrective power for the aforementioned difficulty of accelerative or frequency distortion. However, the techniques are limited to the F2F code.

OBJECTS OF THE INVENTION

In light of the foregoing difficulties in this field and shortcomings with the known prior art, it is an object of this invention to provide a compatible, self-clocking, code reading technique and apparatus which may be utilized with all self-clocking codes.

It is a further object of this invention to provide an improved technique for reading self-clocking codes which have reference measurements external to each data bit or to provide an improved technique which utilizes the data bits as reference measurements for the succeeding data bit in an improved fashion that is compatible with all self-clocking codes.

A further object of this invention is to provide an improved means of decoding self-clocking bar codes which means also is capable of detecting errors at the bit level before the entire stream of bits has been read.

Still another object of this invention is to provide an improved technique for avoiding the ambiguities which may occur in decoding self-clocking bar codes on the basis of bar spacing transitions.

The foregoing and other objects, features and advantages of the invention will be apparent from the following more particular description of preferred embodiment of the invention, as illustrated in the accompanying drawings.

SUMMARY OF THE INVENTION

The technique of the present invention generally comprises steps of measuring a reference length of at least one bar and space sequence (or pair) placed in an initial location ahead of the first data bit of a code stream, regardless of the code format being employed. This may be done by detecting the pulses at the leading and trailing edges of bar codes, (the transition points) for example. Alternatively, a fixed reference length may be provided to the decoder apparatus for use without measuring any other reference. Then, all the possible valid locations for the next leading edge pulse, a signal in the signal stream, and the next trailing edge pulse in the signal stream for the immediately following data bit are predicted. These possible valid pulse locations are all of the various valid locations permitted in a given code format, and are predicted, or projected in time, utilizing predicting algorithms. The algorithms have been developed to account for accelerative or other types of distortion or for constant velocity scanner operation. Then a search function or gating function is conducted segmenting the data stream about each possible predicted valid leading and trailing edge location for the next data bit. The leading and trailing edge pulses are found, each pulse being in one of the various possible locations therefor. Finally, the data content of the bit cell in question is defined according to the locations in which the possible valid edge pulses were found. The basic method may be repeated utilizing the width of the data cell just measured and rescaling it to make a new reference for the following data cell. If a leading edge pulse is not found within one of its various valid locations, or a trailing edge pulse is not found within one of its various valid edge locations, an error is instantly indicated at the bit level.

BRIEF DESCRIPTION OF THE DRAWINGS

FIGS. 2A–2E illustrate logical decoding tables for several known self-clocking codes analyzed according to the present invention.

FIG. 3 illustrates a special character useful in decoding the beginning or end of data.

FIG. 4 illustrates the use of preamble characters.

FIG. 6A illustrates a special character that can be used to identify the direction of scan or to signal other logical meaning that is not data.

FIG. 6B illustrates another way to use the character of FIG. 6A.

FIG. 8 illustrates a general bar code element set which can be used for constructing bar codes.

FIG. 9 illustrates a bar code character set constructed from the elements in FIG. 8.

FIG. 11 illustrates the principles of count-scaling as utilized in the preferred embodiment and also shows how counting in $\alpha$ units is utilized.

FIG. 12 illustrates the principles of determining the width of a search segment or window for any bar code.

FIG. 14 illustrates the principles of application of the preferred method to any self-clocking code and the principles of ambiguity resolution are illustrated also.

FIGS. 18A through 18E illustrate the logical matrix decoded data content for several codes in accordance with the technique of FIG. 17 as applied to apparatus as shown in FIGS. 10A, 10B and 16.

Figure 1:
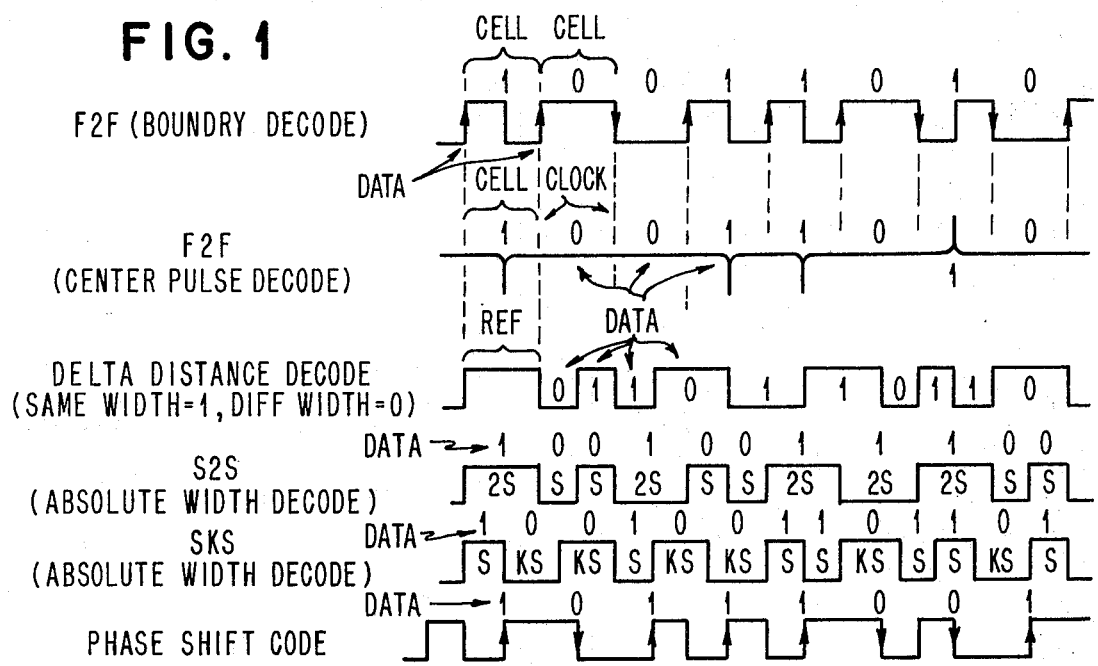
FIG. 1 illustrates several known self-clocking bar code schemes.

A detailed description of a preferred embodiment of the invention, together with an example of its application to a generalized self-clocking code format will be given shortly. At the outset, however, it will be assumed that the decoder apparatus and method will be applied to decode the data content of a signal stream and that the signal stream is coming from a primary sensor or scanner or from a communications line. It will further be assumed that the signals appear in the form of electrical potential or current variations in time as more or less square edged waveforms. The necessary sensor and scanner apparatus, or the communications line adapter apparatus, will not be shown or discussed; those aspects of a signal processing system are well within the skill of those in the art and do not form a part of the invention of concern herein which deals with decoding the signal stream once it has been obtained.

The task then becomes one of isolating and detecting the pulse or pulses within the incoming signal stream that indicate data in a given code format. The incoming data stream, as it has been scanned or transmitted, is a series of varying electrical signal levels or pulses, regardless of the type of code format utilized. The occurrence of a pulse, or a characteristic of a pulse's occurrence, such as polarity, at a location fixed by the frequency of signal transition spacings, or the combination of widths of bars and spaces, is utilized in all of the code formats to signify data.

In general, frequency variations in the incoming signal stream can be equated with "bar width" variations on the encoded media. The bar width, pulse spacings, or edge transition signal polarities can all be utilized as significant data events, depending on the encoding scheme used.

In general, self-clocking data codes are written digitally as "bits" with the bits being defined as residing within "cells". The cells are intervals along a data record, or spaces or lengths of time in a signal stream, within which a variable, machine-sensible signal event occurs or does not occur, or in which some characteristic of the event signal is varied to signify the data content of the cell. These codes are generally read from a medium or received as transmitted signals. In either event, a stream of signals is presented for processing at a decoder to determine the code content of the various data bit cells. There must be provided a way to identify the bit cells by signifying the boundaries of each cell so that the bits can be separated and decoded. In self-clocking codes, both data events and clocking events usually occur. Sometimes the clock events may be interleaved with data events, and sometimes they may be separate from or even coincident with data events. It is always necessary to separate, or at least recognize, the data and clock events and to interpret the data contents in the signal stream of the code.

It is also necessary to distinguish between noise pulses which may occur and signals and to correct the signals for distortion effects or to compensate for these effects. The clock signals in the self-clocking codes facilitate this by providing an automatic synchronization for the separation function and/or for eliminating noise bursts or pulses from the data stream.

In a bar code of the printed variety or magnetically encoded sort, the bars or the spaces can be utilized to define intervals of time or distance. These intervals are sequentially arranged in bar, space, bar order. Magnetically, the equivalent would be plus magnetization, minus, plus, etc., at different spacing intervals. The interval of time or distance which lies between the trailing edge of a bar (the leading edge of a space) and the leading edge of the next bar (trailing edge of the space) is a function of the code format utilized. If a measurement or examination is made of the interval between a leading edge and a leading edge or a trailing edge and a trailing edge in sequence, it will be noted that one combined bar and space interval will be measured, i.e., one complete bar and one complete space will be traversed.

Various bar width or bar width combination coding schemes exist. Sometimes, instead of using the terms "bar width" or "spacing width", the "frequency" of various alternating voltage signals is specified so that the "zero crossings" occur spaced in time at various points, depending on the code content to be encoded and the code format being used. However, all such codes use areas of detectably different characteristics on the media or in the signal stream to mark the edges of the "bar-space" transitions.

All such codes interleave the areas of different characteristics on a one for one basis, although more than one bit of data may be contained within a single bar or space according to the code format used. A bar or a space having one characteristic that can be identified is also followed by a space or bar, respectively, of another detectably different characteristic.

Some code schemes use a relatively large plurality of bar and space combinations, that is several bars of different widths and spaces of different widths may be used separately or in combination to create a variety of bar-space permutations or patterns which may be used to represent different encoded characters. Some simple codes use only a single bar and space in combination and vary the order of presentation of the bars and spaces. Others may add the variation of the relative widths of the bar and space. Some specific examples are illustrated in FIG. 1.

In FIG. 1, reading from top to bottom, are several lines of code patterns which may be viewed as signal stream input to a decoder apparatus. The various types of code are F2F — center pulse code, F2F — clock pulse code, SKS, S2S, delta-distance, and phase shift code.

It may be observed from FIG. 1 that "bars" (which may be viewed for purposes of description as the interval during which a positive or "up" level is present in each of the signal streams), and "spaces", (which may be veiwed as the time during which the signal level is "down" in the signal stream patterns in FIG. 1), are interleaved on a one for one basis. It will be instantly observed that the interval between successive leading edges of the bars or between the successive trailing edges of the bars equals the distance spanned by one bar and one space, while the interval between the corresponding trailing edges equals the interval of another bar plus the same space. It will be further observed that the intervals required to create this pattern use three signal transitions to define two positive-going pulses and one negative-going pulse or vice versa, (one bar and space) and the polarity plus and minus of the transition will always match at the leading edges and at the trailing edges of successive bars and of successive spaces.

It has been found that, regardless of the code format used, the sizes of intervals between successive positive transitions or between successive negative transitions, (leading to leading edges or trailing to trailing edges in the signal stream) can assume, for each code format, only a certain number of possible interval sizes. This being so, it is possible that, beginning from a positive or a negative transition, the next occurrence of a similar positive or negative transition can be located at one and only one of several possible locations or intervals, depending on the specific data which has been encoded in the given code format. It also has been found that the combination of positive to positive (leading to leading) and (trailing to trailing) negative to negative intervals uniquely defines the data content of the segment of the coded signal stream located between any two successive like (positive, positive or negative, negative) signals. The Crouse et al U.S. Pat. No. 3,723,710, noted previously, teaches this concept of making such measurements and uses the measurements in application to a specific type of code format in which a reference interval is contained within each coded character. In this technique, however, the entire character must be scanned and the various intervals measured and processed and compared with a reference before the data content is learned.

It has now been found that it is not necessary to monitor the signal stream continuously to decode it, as will appear in the present invention. It is only necessary to isolate two adjacent (successive) positive or negative signals, or a reference width, and then to predict, according to the type of code format known to be received for processing, where all of the next possible intervals for matching positive and negative signals can be located. It is only necessary to monitor the segments of the signal stream at these predicted locations, or points in time, to determine which of the possible locations for the next succeeding positive and negative pulses is occupied. Then, according to which of the various possible locations is occupied, the data contents of that segment of the data stream can be decoded at once.

The essence of the technique employed is as follows: a "measurement" is made by detecting two like signals at the beginning of a decoding operation on a reference interval encoded with the data to be transmitted or scanned first. Alternatively, a fixed reference may be used and built into the decoder as a fixed time reference. The reference interval, not forming a part of the data character or or data stream, does not need to be decoded. A "measurement" is made, if a reference interval in the data stream is used, of at least one bar-space sequence or pair, although multiple bars and spaces can be utilized as will appear below. A prediction is then made, based on the known code scheme and on the reference, for all the possible valid locations of the next immediately following leading edge and the next immediately following trailing edge, within the range of permutations allowed within the given known code format. It is assumed that it is known at the decoder what type of code is to be decoded. Search gates are then erected segmenting this search about each of predicted valid edge transition locations for both the next leading and the next trailing edges in the signal stream. Leading edge predictions are based on leading edge interval measurements and trailing edge predictions are based on trailing edge interval measurements to avoid problems with print spread distortion. According to which of the various possible locations in which the leading edge is found to reside and in which of the possible locations the trailing edge signal is found to reside, the data content of the bar — space pair is defined in accordance with the known code format.

Before continuing with the detailed discussion of a preferred embodiment and an example of its application to a generalized code scheme, it is necessary to introduce a variety of new terms and concepts. This will be accomplished by way of a general discussion which follows.

In general, data is written in terms of variations of an observed or machine-observable effect. For example, optic or magnetic bar widths or combinations of widths or of edge transition spacings may be used. The frequency of edge transition spacings, (as developed by a scanner scanning the appropriate medium) or electrical pulses as applied to a communications line from a scanner device, are also in general use.

The observed or observable effect, which has at least two different observable states, will exhibit its change in state as an "event". In the present invention for purposes of definition, these events will be assumed to be counted sequentially and assigned a significance as being either odd or even events according to the count. Arbitrarily, odd events will be associated with data and even events will be associated with control information. It is apparent that data and control events will be interleaved on a one for one basis by the definition of the odd and even counting scheme.

In each type of known code format for the self-clocking codes, a minimal interval of space or time between successive (unlike) events exists and, below the spacing, events do not occur. This is to say there is some minimum spacing of events which is not violated. The minimum interval is arbitrarily chosen for a given code format and all other intervals between events bear a relationship to the minimum interval by some factor of size greater than the minimum.

The minimum interval between two successive (like) data pulses or two successive (like) control pulses will be nominally two times the minimum interval between adjacent pulses. This is clear since it is already known that there is a minimum interval and that the intervals are interleaved on a one for one basis. The significance of whatever data is contained in a data interval between two data pulses will be determined by the definition of the code format which assigns a given meaning to the size of the interval between the successive data pulses or to some other characteristic of the data events themselves, such as their polarity. It has already been stated that there will be other size intervals which are different from, and relative to, the minimum size between unlike signals.

Let P be defined as the number of intervals in a given code format which are different from and larger than the minimum size interval between unlike signals. There will then be a maximum of 2P+1 valid combinations of bar-space intervals taken two at a time. These will form data intervals or control intervals. These combined bar-space intervals will encompass total expanses of space or time which are different. That is, the total number of different possible intervals between two successive like events, be they data events or control events, is defined by $2P + 1$ (with repeats of the same interval being allowed).

Data may be written by first providing a preliminary stream of events which follow the rules for minimum interval spacing and/or for one or more different other factor intervals which are possible. The preliminary events may consist of control and data event intervals which are interleaved. Typically, such intervals would be encoded originally as a preamble bit stream or symbol. When scanned or transmitted, this symbol would produce the desired preliminary event stream. These preliminary events provide reference measurements for at least one of the $2P + 1$ possible data event intervals and/or control event intervals. At least one control event interval and/or one data event interval must be provided in the preliminary event stream or preamble or a fixed reference must be provided to the decoder first. Two successive data events in the preliminary event stream may be utilized for predicting the possible positions of the next succeeding data event or control event according to the maximum number $M = 2P+1$ of the possible pulse positions or intervals resulting from the combination of any two intervals chosen from the different interval factors originally selected for constructing the code. Preliminary control events may be utilized in similar fashion to predict all possible positions for the next control or data event. The possible locations of data and control pulses, respectively, can be predicted from either the preceding data pulse interval or control pulse interval, since both of these intervals lie in the family of possible intervals as determined in a given code format.

Alternatively, the possible location for data and control pulses can be predicted from a fixed reference as will appear later. The predicted intervals should ideally be measured from the occurrence of the last like type pulse in order to avoid possible distortion effects due to print spread, for example, but as will appear later, important savings in logic can be made if all of the gates are positioned relative to either the last data pulse or control pulse and no spread distortion occurs.

The combined occurrence of the next control event at one of its 2P+1 possible interval locations together with the occurrence of the next succeeding interleaved data event at one of its possible 2P+1 interval locations, defines a combination of a control event and a data event, each occurring at one each of the possible locations. The combinations will uniquely define the data content of the data interval according to whatever data format or code is assigned to that combination of control and data event location occurrences. In addition, a definition choice or criteria for the data content, which may also be utilized as a command function for a future occurrence of a specific combination of data and control event location, may be assigned to one or more of the $(2P+1)^2$ possible control and data event interval location combinations. These combinations may be arranged in a decode matrix corresponding to the control and data intervals, taken two at a time.

Data and control event intervals can be utilized, when they occur, for a new reference by rescaling them to be equivalent to the preliminary reference or interval, or to a known multiple factor of the reference interval. The resulting new reference intervals can be utilized to predict the possible occurrence locations for the next succeeding data and control events, respectively.

For example, if a data event occurs at a larger interval than the preliminary reference data interval, that data interval may be reduced or normalized to the original reference interval size (one of the 2P + 1 possible intervals) so that it becomes the reference interval for the next succeeding data interval predictions. The preliminary or reference events, or measurements given or used for control and data sampling intervals, may consist of any of the 2P + 1 possible interval factors, a combination thereof, or any arbitrary length. The choice of the reference interval factor is determined by considerations such as the maximum jitter tolerance and/or the code scan or acceleration effects permissible within the limits of the decode process.

Figure 7:
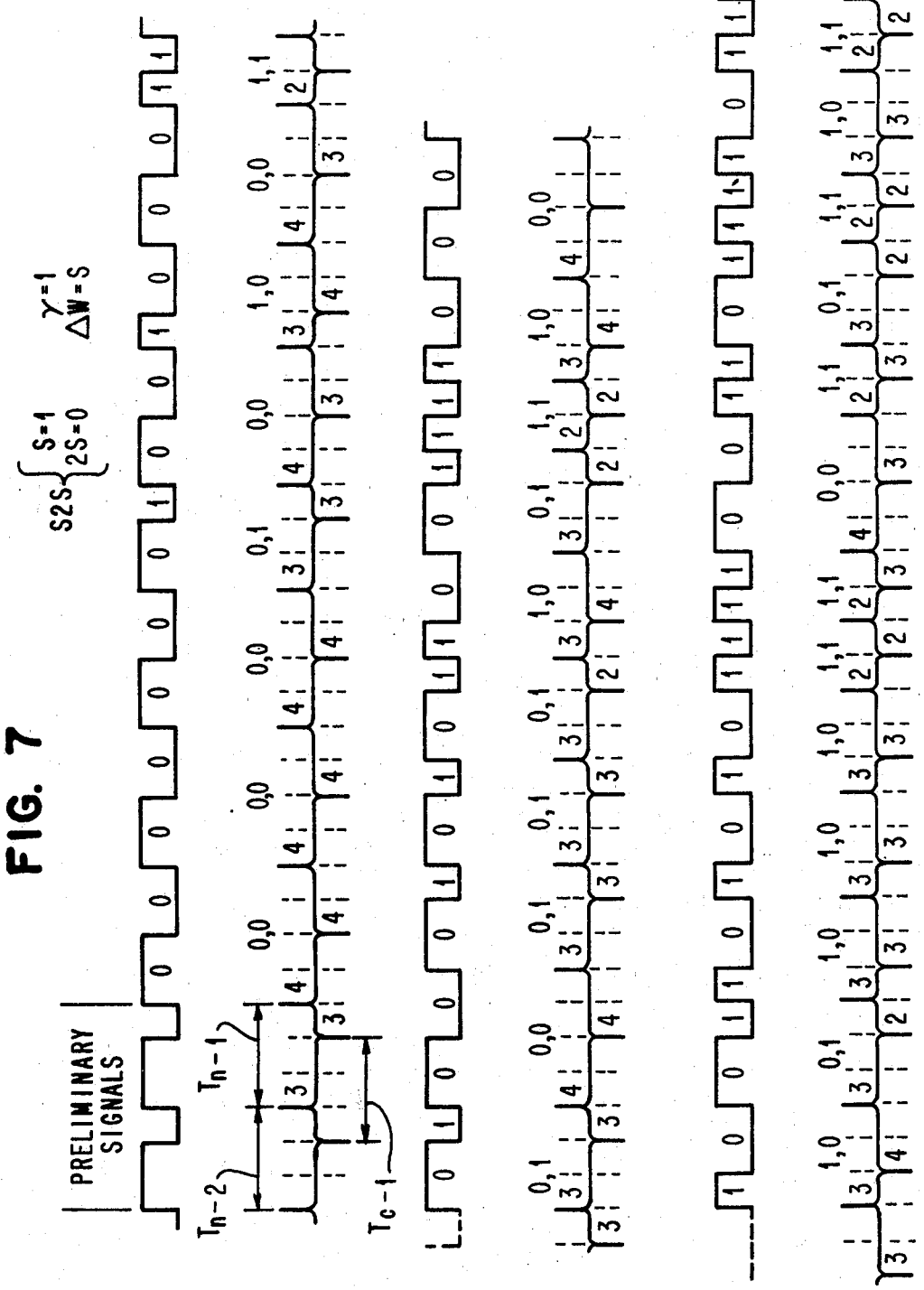
FIG. 7 illustrates all of the bar code combinations for a two-width S2S code and shows the data and control pulse spacing intervals which can occur.

FIGS. 2A through 2E illustrate five different $(2P + 1)^2$ decode matrices. Each decode matrix was formulated for the specific code format assigned to the coded indicia by writing a consecutive series of four bit characters which include all the possible bit combinations beginning with the characters 0000 and ending with the characters 1111. An example of this procedure is illustrated in FIG. 7 for the S2S code format.

The preliminary events used to define the sizes of data and control event intervals for the matrices in FIG. 2A through 2E consisted of two bars and two spaces like those shown in FIGS. 4–7. Each decode matrix is characteristic of a given code format which assigns a given meaning to the size of the interval between successive data and control pulses, considered as a pair of events. Each decode matrix illustrated will have three columns and three rows. This is true for the case where P, the number of different factors of intervals different from the basic minimum, is equal to one, as it is for all of the code formats illustrated. That is, there are two possible bar or space widths. Consequently, the maximum number of different intervals in which a data or control event can occur is 2P + 1 = 3. The formula is general, however, and other codes, such as a 3-width code, would have larger matrices. (The matrix for a 3-width code would be 5 × 5; for a 4-width code, 7 × 7, etc.)

The columns are arbitrarily designated as data pulse intervals, "DPI". The rows are arbitrarily designated as control pulse intervals, "CPI". In all of the matrices illustrated, both the CPI and the DPI have a value of 2, 3, or 4 times the minimum interval width. The coordinate intersections of the matrix correspond to one of the $(2P+1)^2$ specific interval combinations of CPI and DPI. The CPI occurs first in time (even pulses) during the decoding process and is followed by the completion of a DPI. The significance of the data contained in the data interval is governed by the control interval for each of the code formats corresponding to FIGS. 2A through 2E.

With the exception of the decode matrix of FIGS. 2B–2C, at least one bit of data is uniquely defined by each CPI & DPI combination. No other data or control criteria is required to decode these code formats with the exceptions noted. However, the matrices in FIGS. 2B and 2C correspond to the S2S absolute width codes. It can be seen that the CPI-DPI coordinates 3, 3, have two 2-bit data representations. One may be defined as a type "A" data representation, as an arbitrary name, with the other as a type B data representation. The proper choice of which representation, A or B, is to be decoded when a 3, 3 interval combination occurs, is determined by the last occurrence of a 3-2, 2-3, 3-4, or 4-3 interval combination as shown in the matrix table. The B type designation will be chosen first when, prior to reading any coded indicia, the preliminary event stream is commenced and the decoder apparatus is cleared of previous decoded data.

In all of the decode matrices in FIGS. 2A through 2E there are at least two CPI-DPI coordinate locations which have no data associated with them. These are available for special instruction functions such as "start of data", "end of data", "right to left" or "left to right" scan indication, or "change of code" format indications. Other multiple-width codes would have even more vacant locations for such uses. These vacant interval combinations such as 4, 2 and 2, 4 can be obtained from a special bar and space interval indicia configuration such as illustrated in FIG. 3. This bar and space combination can be utilized as a preamble or preliminary event signal stream producer and may be called an instruction indicia configuration IIC. By using this special instruction configuration, one can avoid the necessity of assigning some portion or set of data characters to a non-data identity function as a preamble stream.

As illustrated in FIG. 3, the IIC consists of two minimum width bars separated by a space of three minimum widths or "slot times" as the term is sometimes utilized. The IIC must be preceded and followed by a minimum space which is inserted in the code stream so that there will be a break in the signal stream being processed. This restriction guarantees that the interval sequences 2, 4 will be next followed by the 4, 2 sequence. The 2, 4 — 4, 2 interval sequences can be assigned any combination of data bits, if desired, in combination with the specific logic instruction otherwise intended. The data bits can taken alone or in combination with the logic instruction. Examples of the use of the IIC will be given next.

Figure 5:
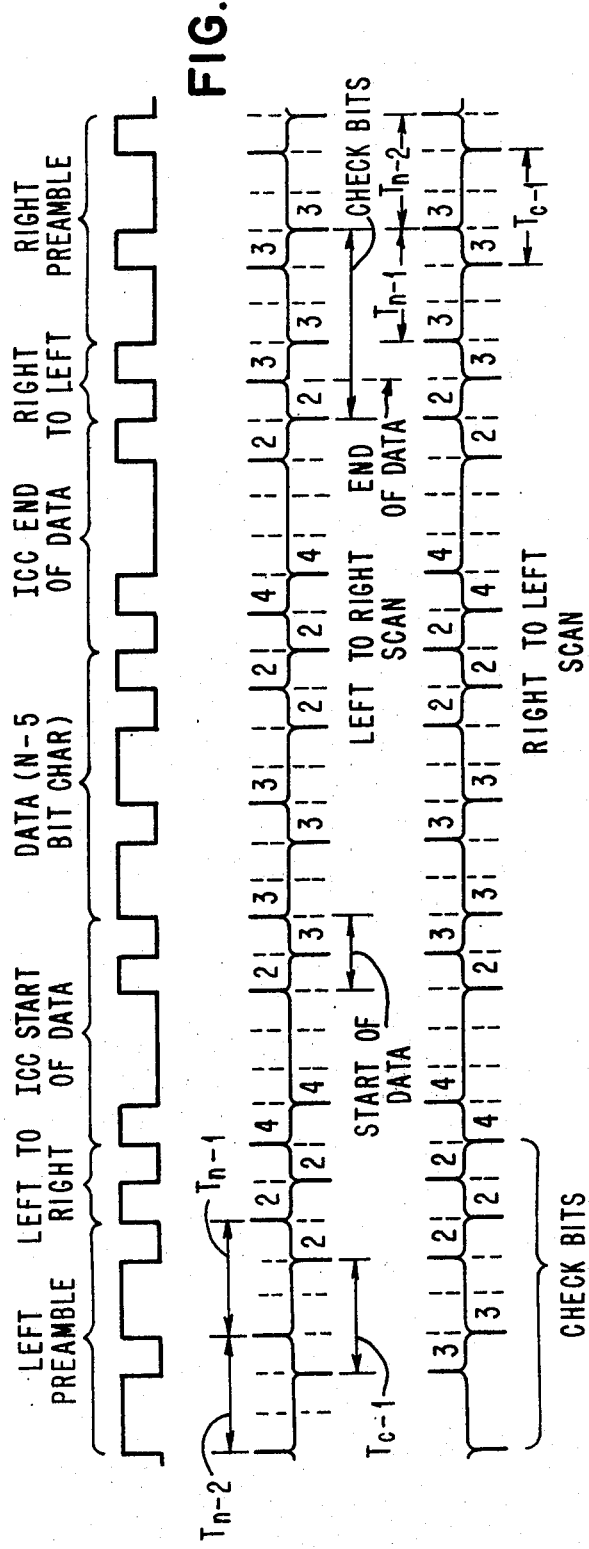
FIG. 5 illustrates how special characters like those of FIGS. 6A and 6B can be used to indicate start of data or end of data in a bar code.

Consider the stream of indicia illustrated in FIG. 5. The stream of signals begins and ends with a preamble indicia configuration. A single 5-bit data character is shown sandwiched between two IIC's. It is to be understood that numerous 5-bit or other bit number data characters could be sandwiched between the IIC's instead of one, or that many more or less data bits than 5 could be encompassed between the two IIC's. In scanning the coded indicia or signal stream in FIG. 5 from left to right, the first IIC generates a 2, 4 and 4, 2 interval combination in the sequence of signals at the "start of data". The next occurrence of the IIC can be utilized to signal the "end of data." Use of the IIC in this manner avoids the necessity of counting data bits to determine the end of data in a given code format, such as one which has eight data bits for example, or it can be used to avoid the necessity of placing a unique stream of binary 1's or the like before and after a data stream in order to signal the start and end of data.

FIG. 6A is a further extension of the notion set forth in FIG. 5. The stream of coded indicia in FIG. 6 contains two IIC's like FIG. 5. However, the left and right preamble indicia configurations are different and the data indicia precedes the IIC's. From such a stream, a determination can be made as to whether the indicia stream is being scanned from left to right or from right to left. The IIC's, however, perform the same function of isolating the coded data indicia from the initial or preliminary indicia and form the terminal (ending) indicia.

The IIC may also be used to indicate a change in the data format of any of the matrices of FIG. 2, as a means of compressing the space of time required to write or read the code, by reassigning the meaning of a long series of alternating double space bars and double minimum spaces. This is shown in FIGS. 2A, B, C. The compression technique allows the same data to be extracted from an alternating stream of single minimum bars spaced by single minimum spaces. In effect, this IIC technique can be used to increase the effective data density.

A second special indicia configuration can be constructed for branch indicia configuration. The branch indicia configuration BIC is identical to the IIC, except for the rules of application. The 2, 4 BIC must be preceded by a single minimum space interval and followed by two minimum space intervals. A 2, 4 BIC is illustrated in FIG. 6B.

Turning now to a discussion of self-clocking bar codes in general the characteristics of a generalized bar code will be discussed and the search prediction formulas for segmenting the time for searching for possible interval transitions in a given code or in a generalized code will be developed.

Turning to FIG. 8, an analysis of bar coding in its general sense is depicted where the various bar code bar or space elements are shown. The basis of constructing the bar code begins with a minimum width bar or space element depicted in the top line of FIG. 8 as having a given width W for the total interval between two adjacent (unlike) signal pulses. All known self-clocking bar codes utilize a minimum width bar or space element and at least one other different bar or space element having a different width.

In general, the width of a code bar or space element may be depicted as width W and a width of the next largest bar or space element can be viewed as the width W plus an amount of change $\Delta W$. S is used as the designation for naming the minimum width of a bar or space actually used in the code, and W is used as the descriptor for the actual length of such a bar or space. $\Delta W$ will be defined as the minimum employed or the minimum detectable difference in width between two similar bars and/or spaces. The limiting case for $\Delta W$ is the minimum detectable difference in width for the resolving power of the scanning device used.

The question then arises that if one wishes to look for the next possible pulse at a specific location, and a search window segment in time positioned about that predicted location will be utilized, what is the possible width of a segment or window which can be used in order to avoid confusion by overlapping search windows with other possible pulse locations?

Turning to FIG. 12, an analysis of this question will be made. At the top of FIG. 12, two minimum width bar code bar (or space) elements are written adjacent one another in line $b$ followed by the next possible interval. In line $e$ is shown the next largest bar-space transition that may be written from the code elements chosen from the code element set in FIG. 8.

If one wishes to isolate a pulse occurring at the termination of a given interval of two combined bar and space elements, a search gate can be erected in time about that predicted location in time, $T_n$. A search gate may be located about a predicted location beginning at a time $T_n$ minus an amount $\alpha T_n$ and it may end at a time $T_n$ plus an amount $\alpha T_n$.

It is necessary, however, to avoid overlaps from adjacent search windows, or segments, during searching for pulses in adjacent possible locations.

The two closest possible pulse locations are illustrated in lines $d$ and $c$ of FIG. 12, and the difference between these possible pulse locations is an amount $\gamma S$ as may be seen from the diagram. Therefore, $\gamma S$ equals the amount of time which would be encompassed by half of a search window erected about the first possible pulse location ($i=1$) and half of a search window erected about the second possible pulse location, ($i=2$) at maximum, so that the windows will not overlap. If a given window about a predicted pulse position has a dimension of $\pm \alpha$ times the length of time to the predicted location, $T_n$, it may be seen that a search window has a total width of $2\alpha T_n$ and that $2\alpha T_n$ can equal, at most, $\gamma S$. The maximum value of $\alpha$ is then given by $2\alpha T_n = \gamma S$ and since minimum $T_n = T_0 = 2S$, $4\alpha S = \gamma S$ or $\alpha = \gamma/4$. This will be proved in more rigorous detail later. ($T_0$ is the minimum interval between two like signals and results from the combination of a minimum width bar and space.)

As shown in FIG. 8, different code bar elements or space elements bear a relationship one to another given by the general expression $W_n = S + P\gamma S$ for the range $0 \leq P \leq n$ where $\gamma$ is the lowest detectable or useful unit of increase in width, i.e., $\gamma$ is the minimum unit of increase in width, or the lowest common denominator of all increases in width, which defines the difference in width of one bar or space over another. In other words, $\gamma$ times the minimum width of a bar equals the minimum amount of width increase $\Delta W$. Therefore, $\gamma$ is a dimensionless number.

In general, it may be seen that $\Delta W$, the amount of difference in width between a bar and a space or another bar, is equal to $\gamma \times S$, where S is the minimum width of a bar or space which is used in the code. $\gamma$ in general will then equal $\Delta W/S$. The abbreviation S is utilized for the term "slot width" which is often used in the art to define the minimum width of a bar or space utilized in a code or to define the minimum distance between two signal transitions which may occur in the code.

In the equation given above, the term P is an integer lying in the range of 0 to $n$ and is utilized to define the number of a bar code element chosen from the set in FIG. 8. For example, the minimum width S has a value of P = 0; the next largest width has a P value equal to 1, and so on. It may be seen that P defines the integer number of a code element and is used only as an index to define how many different bars are utilized in the code element set. Many common codes utilize only two different widths; generally these are a minimum width and some width which is larger than the minimum. In these types of codes, the P value is equal to 1, that is, there is one bar or space element which has a width different from the minimum space or bar width.

The general formula $W_n = S + P\gamma S$, for $0 \leq P \leq n$, may then be seen to be dependent on P being an incremental integer and that no skips occur; that is, P does not skip in value by more than one unit. This is not to say that all of the bar code elements must have P numbers which differ from one another in a continuouosly increasing sequence of integers, since skips can occur in the bar width or space widths which are chosen or selected for constructing a code. It is more appropriate that P be defined as a number of minimum units of increase $\gamma \times S$ which are added to the basic minimum width S in order to create the width of the bar code element which is being defined so that in general $$\frac{W_n - S}{\gamma S} = P,$$

with $\gamma$ defined as before equal to $\Delta W/S$. With the P values thus defined, skips may occur in actual incremental sizing of the bar or space elements and the value of P will reflect this fact. The unused or skipped bar or space elements will simply not be part of the bar code element set chosen to construct a code. It is important to note that the actual number of bar code widths which differ from the minimum will be given by the maximum P value only when no skips have occurred in the regular progression of widths which are used to construct bar codes.

Turning to FIG. 9, a generalized self-clocking code is illustrated. In constructing the code, combinations of two of the bar code elements from FIG. 8 are written in conjunction with one another so that the minimum transition interval T between two like polarity pulses will be given by the top line in FIG. 9 as 2S. This, in turn, will be defined as $T_0$ and is the minimum combination interval of length which can be constructed from the code set of FIG. 8. The top line of FIG. 9 therefore shows a representative bar and space transition from a representative code constructed by interleaving bars and spaces of varying widths or of similar widths with one another as is known in the art.

The second line of FIG. 9 shows the first transition interval combination which is different from the minimum transition interval combination. It has a length defined as $S + (S + \gamma S)$ or $2S + P\gamma S$ where P is defined as before as the number of bar code elements which have a width greater than the minimum. However, this equation is true only for the special case where no skips in the bar code element width members are made in selecting the bar code elements for constucting the code as shown in FIG. 9.

A more useful designation for width combinations is to give them index numbers according to the relationship that they bear to one another. Thus, the minimum transition interval of 2S as shown in the top line of FIG. 9 may be assigned an interval index number equal 1. This is abbreviated as $i=1$. The next largest interval combination resulting from the combination of the minimum width S plus the next largest width, $S + \gamma S$, is given an index number $i=2$ and so on. "i", therefore, is defined as the index number of the time interval between two like polarity pulses and it is really the interval between any two combined bar and space width elements chosen from FIG. 8. It may be seen that $P = i-1$, in general.

In general then, the length $T_n$ of a bar and space combination as shown in FIG. 9 will be $2S + (i_n-1) \times \gamma S$ for the range $1 \leq i \leq n$. As an interval index number, $i$ can take on incremental integer values only and it is merely the designation of a specific interval of combined length T which can be constructed utilizing a selected set of bar code elements from FIG. 8.

It is apparent that, if one is allowed to repeat the usage of a given bar width as a bar of width S and a space of width S as shown in the top line of FIG. 9, etc., that the maximum value of $i$ is equal to $2P + 1$. That is, the number of different total interval lengths T which can be constructed utilizing two bar and space widths chosen from the elements in FIG. 8 will be equal to $2P + 1$ where P is as defined previously.

It is also apparent that, while the total length $T_n$ could be defined in terms of P instead of $i$, it is more appropriate to use the $i$ since it will define a specific combined length of two bar elements added together, whereas P only defines a given element in the bar code element set of FIG. 8.

The number of combinations of widths which can be made of bar elements or space elements taken two at a time with repeats allowed will be $2P+1$, where P is the actual number of different bar widths used in the code set construction and not counting the minimum width S. Therefore, the number of possible locations or intervals for the occurrence of the next pulse of the same polarity to occur will also be $2P + 1$ different intervals of time T and in general, $T_n$ will equal $2S + (i_n - 1) \times \gamma S$ where $0 \leq n \leq 2P + 1$ and P takes the values assigned to the bar code elements.

The present technique of decoding, then, which is based on predicting from the occurence of a given pulse in time, all of the possible locations at which another pulse of like (or unlike, if desired) polarity may occur given the type of code, and on the knowledge of the code set used to construct the code. Then one must erect search gates segmenting the search time at each possible location to search for each such possible pulse.

The expression just derived will yield predictions for the next possible occurrence of all of the possible locations of pulses of like polarity based on an arbitrary reference interval of time which is based on the minimum interval of time $T_0$ which can exist between two like polarity pulses. A first order velocity correction for variations in scanner velocity can be obtained by utilizing the previous interval of time which is actually found to exist between two like polarity pulses. This, however, must be scaled by multiplying the interval times the scale factor R. The resulting expression for a first order velocity correction technique based on using the length of the previous interval as a reference for projections for the next possible interval locations would be $$T_n = T_{n-1} \times [\frac{2-\gamma+j\gamma}{2}] \times [B_{i\gamma} \pm \alpha_{i\gamma}].$$

As will be developed below, a second order velocity correction is possible using equations based on the previous two transition interval lengths and the second order velocity correction formula takes the form $$T_{n(i,j,\gamma)} = T_{n-1_{(j,\gamma)}} [1-A(1-\frac{T_{n-1(j,\gamma)}}{T_{n-2(j,\gamma)}})] [B_{i,j,\gamma} \pm \alpha_{j,\gamma}]$$

where in general, $T_{n-1_{(j,\gamma)}} = T_{n-1} \times R$, $T_{n-2j\gamma} = T_{n-2} \times R$, etc. That is, the two previous interval lengths which precede a given interval $T_n$ are named $T_{n-1}$ and $T_{n-2}$, respectively, and these are scaled to bring them into proper perspective with one another and with the base standard, whatever it is, by multiplication by the scale factor $R$.

Table I below summarizes the algorithms or formulas for three conditions: (a) using a constant reference width, (b) a first order velocity correction formula using the previous transition interval length scaled to a normal value as a reference, or (c) two previous transition interval lengths for a second order velocity correction.

TABLE I

Constant reference interval:
(no velocity correction)

$$T_{n(i,j,\gamma)} = T_{r(j,\gamma)} [B_{i,j,\gamma} \pm \alpha_{(j,\gamma)}]$$

where: $T_{(rj,\gamma)} = (T_0) \times (R_{(j,\gamma)})$, and $B_{i,j,\gamma} = \frac{2+(i-1)\gamma}{(2-\gamma)+j\gamma}$ and $R_{(j,\gamma)} = \frac{(2-\gamma)+j\gamma}{2}$ or $\frac{2+\gamma(j-1)}{2}$ and $0 \leq \alpha_{(j,\gamma)} \cdot \frac{\gamma}{2[(2-\gamma)+j\gamma]}$ for all $i = 2P+1$ (max)   $p =$ integers (only)
$j = 2P+1$ (max)
$T_0 =$ minimum interval $= 2S$,
$S =$ slot width (minimum transition distance)
$\Delta W = \gamma S$
$\gamma =$ a constant for a given code element set First order velocity correction:

$T_{n(i,j,\gamma)} = T_{n-1(j,\gamma)} [B_{i,j,\gamma} \pm \alpha_{(j,\gamma)}]$
where $T_{n-1} =$ last length $T_n$
$T_{n-1(j,\gamma)} = T_{n-1} R_{(j,\gamma)}$, or
$T_{n-1(j,\gamma)} = T_{n-1} [\frac{2-\gamma+j\gamma}{2}]$ and $B_{i,j,\gamma}$ and $\alpha_{(j,\gamma)}$ are as above.

Second order velocity correction:

$T_n(i,j,\gamma) = T_{n-1(j,\gamma)} [1-A(1-\frac{T_{n-1(j,\gamma)}}{T_{n-2(j,\gamma)}})] \times$ $\hspace{3cm} [B_{i,j,\gamma} \pm \alpha_{(j,\gamma)}]$
and where  $T_{n-1(j,\gamma)} = T_{n-1} R_{(j,\gamma)}$
$\hspace{2.5cm} T_{n-2(j,\gamma)} = T_{n-2} R_{(j,\gamma)}$
and $T_{n-2} =$ previous $T_{n-1}$ and $T_{n-1} =$ previous $T_n$
and $B_{i,j,\gamma}$, $\alpha_{(j,\gamma)}$, and $R_{(j,\gamma)}$ are as above.

In Table II below, the values for $i$, $j$, $B$ and $\alpha$ are summarized for the special case where $\gamma$ is set equal to 1 which is normally the case in a two-to-one width ratio code such as F2F or S2S. In these types of codes, only two bar widths are used (P=1) and a wide bar or space is twice the size of a narrow bar or space.

TABLE II

| $\gamma=1$ | | $B_{(i,j)} = \frac{2+(i-1)}{1+j}$ | $\alpha = \frac{1}{2[1+j]}$ |
|---|---|---|---|
| $i$ | $j$ | $B_{i,j,\gamma}$ | $\alpha_{(j,\gamma)}$ |
| 1 | 1 | 1 | 1/4 |
| 2 | 1 | 1.5 | 1/4 |
| 3 | 1 | 2 | 1/4 |
| 1 | 2 | 2/3 | 1/6 |
| 2 | 2 | 1 | 1/6 |
| 3 | 2 | 4/3 | 1/6 |

TABLE II-continued

| $\gamma=1$ | | $B_{(i,j)} = \frac{2+(i-1)}{1+j}$ | $\alpha = \frac{1}{2[1+j]}$ |
|---|---|---|---|
| 1 | 3 | 1/2 | 1/8 |
| 2 | 3 | 3/4 | 1/8 |
| 3 | 3 | 1 | 1/8 |

In Table III below, the values for $i$, $j$, $B$ and $\alpha$ are summarized for the general case where $\gamma$ does not equal one.

TABLE III

| $i$ | $j$ | $B_{(i,j,\gamma)}$ | $\alpha$ |
|---|---|---|---|
| 1 | 1 | 1 | $\gamma/4$ |
| 2 | 1 | $\frac{\gamma+2}{2}$ | $\gamma/4$ |
| 3 | 1 | $\gamma+1$ | $\gamma/4$ |
| 1 | 2 | $\frac{2}{\gamma+2}$ | $\frac{\gamma}{2(\gamma+2)}$ |
| 2 | 2 | 1 | $\frac{\gamma}{2(\gamma+2)}$ |
| 3 | 2 | $\frac{2(\gamma+1)}{2+\gamma}$ | $\frac{\gamma}{2(\gamma+2)}$ |
| 1 | 3 | $\frac{1}{\gamma+1}$ | $\frac{\gamma}{4(\gamma+1)}$ |
| 2 | 3 | $\frac{\gamma+2}{2(\gamma+1)}$ | $\frac{\gamma}{4(\gamma+1)}$ |
| 3 | 3 | 1 | $\frac{\gamma}{4(\gamma+1)}$ |
| 4 | 3 | $\frac{\gamma}{2(\gamma+1)}$ | $\frac{\gamma}{4(\gamma+1)}$ |

TABLE IV

Subset formulas for a P=1 code ($T_{n-1}$ not scaled to reference width).

For reference interval at $j=1$ with first order velocity correction:

Data (or control) search segment 1, $T_{n_{i=1}} = T_{n-1}$
  $(1\pm\alpha)$
Data (or control) search segment 2, $T_{n_{i=2}} = T_{n-1}$
  $(3/2\pm\alpha)$
Data (or control) search segment 3, $T_{n_{i=3}} = T_{n-1}$
  $(2\pm\alpha)$ For reference interval at $j=2$, with first order velocity correction:

Data (or control) search segment 1, $T_{n_{i=1}} = T_{n-1}$ (⅔±α)

Data (or control) search segment 2, $T_{n_{i=2}} = T_{n-1}$ (1±α)

Data (or control) search segment 3, $T_{n_{i=3}} = T_{n-1}$ (4/3±α)

For reference interval at $j=3$, with first order velocity correction:

Data (or control) search segment 1, $T_{n_{i=1}} = T_{n-1}$ (½±α)

Data (or control) search segment 2, $T_{n_{i=2}} = T_{n-1}$ (¾±α)

Data (or control) search segment 3, $T_{n_{i=3}} = T_{n-1}$ (1±α)

Table IV above shows formulas which are derived from the basic formulas to allow a variable reference length to be used, i.e., a reference length established at the $i=1$, 2, or 3, etc., interval can be used as a basis for projecting the next valid pulse locations, but the formula must take these differing reference lengths into account.

What follows is a short section dealing with the derivation of a general acceleration correction formula for the second order (or lower order) corrections as given above.

In a normal bar code of any given type, the width of a "slot" as the term is utilized, is normally defined as the distance between two transitions or signals. This is the width S referred to in previous figures, but for the purposes of these derivations, we will call this width $D_0$.

As a scanner, such as a magnetic read head or an optical scanning head passes over a bar code, a distance for a slot width $D_0$ will be traversed in a time equal to $D_0$ divided by the velocity of the scan head. If the head is fixed and the media moves by it, the result is the same. In general, $D_0 = V \times T$ where V is the velocity (relative) between the scan head and the code bearing medium and T is the time interval between successive transitions spaced on the medium. Therefore, the time to traverse a given interval of length $D_0$ will be equal to $D_0/V$. Taking the total differential of this expression for time $dT = (\delta T/\delta D_0) dD_0 + (\delta T/\delta V) dV$. If there is no jitter or random variation in the edge spacing of the encoded data, $(\delta T/\delta D_0) dD_0$ is equal to 0 and therefore $dT = -D_0/V^2$ since $T = D_0/V$. By substituting this expression for $\delta T$ with respect to $\delta V$ in the previous expression, it will be seen that $\Delta T = -D_0/V^2 \times \Delta V$ and since $D_0 = V \times T$, $\Delta T = -T_0 (\Delta V/V)$. This final expression describes the variation in the predicted time of occurrence of the next desired prediction for the transition in signal level as being proportional to a nominal time $T_0$ times the percent of velocity variation over the interval which has been establilshed in the previous transition to transition interval (defined as $T_{n-1}$). It should be clearly understood that the nominal time $T_0$ here is the interval between the previous transitions which immediately precede the transition interval which is being predicted at a given point in time, not necessariy the minimum interval $T_0$ used earlier.

A general form for an equation for predicting the length of an interval $T_n$, which is equivalent to predicting the point in time at which a given pulse should occur, is given by the following: $T_n = T_{n-1} (1-\epsilon)$ where $$\epsilon = (1 - \frac{T_{n-1}}{T_{n-2}}) \times A$$

for the range $0 \leq A \leq 1$.

The derivation of the value for $\epsilon$ is as follows: as has been shown above, $$\frac{\Delta V}{V} = -\Delta T/T_0,$$

but $\Delta T$ is the time measured between the two preceding transition to transition intervals and, assuming for a moment that a fixed reference interval is used which happens to be equal to the minimum interval possible in the code $T_0$, it may be seen that $$-\Delta T/T_0 = \frac{T_{n-1} - T_{n-2}}{T_{n-2}} \times A,$$

where A is a fixed number in the interval $0 \leq A \leq 1$. In other words, $$\Delta T/T_0 = [1 - \frac{T_{n-1}}{T_{n-2}}] \times A.$$

Therefore, since $\epsilon$ is $\Delta T/T_0$, the value of $\epsilon$ is as indicated above. It should be understood that the values of $T_{n-1}$ and $T_{n-2}$ would have to be scaled to the actual reference interval utilized if the reference interval was not, as it is in this specific special case, equal to $T_0$. The expression above for the generalized form $T_n = T_{n-1} (1-\epsilon)$, where $\epsilon$ takes the value given by the expression just derived, can be utilized in the expressions derived for predicting the possible pulse locations in a given code format based on $i$, $j$, and $\gamma$ simply by substituting the expression for $T_n$ into the predicted pulse location formulas and by multiplying the intervals $T_{n-1}$, $T_{n-2}$, etc., by the reference scale factor R. The result is that given under the second order velocity correction formula listed above in Table 1. The value of A in this expression must lie in the range $0 \leq A \leq 1$ and is defined to be an acceleration factor. The choice of the nominal value for the letter A is governed by specific reader or scanner applications, but it has been found experimentally that a value of 0.68 for A is a good nominal value for hand held reader environments. For constant velocity applications, or nearly constant velocity applications such as machine driven scanners, the value of A can be set to 0. For other applications such as slot readers where moderate accelerations may be seen, a value of $A = 1$ can be utilized.

As mentioned earlier, there exists a potential for ambiguity to arise in a general two element (or more) width code whenever a bar and space combination reaches the same total interval length that another different bar and space combination can also generate, since it then becomes questionable which pattern actually exists. Turning to FIG. 14, the situation is illustrated in general for a two width element code system for which the number of bar width elements which differ from the minimum is equal to one; in other words $P = 1$ as defined earlier. In FIG. 14, the minimum width element has a width S and the next element of code bar or space has a width $S + \gamma S$. In lines A through D in FIG. 14, the possible valid two-element combinations for the total length of control or data intervals which can exist are drawn. It can be seen that for $i = 1$ and $i$ = 3, there exists only a single combination each which can produce the interval length. However, for $i = 2$, there are two different valid combinations which can achieve the same total length as illustrated in lines B and C. If, as is often the case, a code which puts significance on the absolute width of the bar elements is being read, then a question arises as to which code pattern, i.e., line B or C exists when all that one is looking at is the total interval length at the $i = 2$ position. As will be developed below, there exist some simple rules which resolve the ambiguity.

For simplicity's sake, let us assume that $\gamma$ in FIG. 14 is equal to 1 since we can then express the S and $S + \gamma S$ in whole units of S rather than in fractions. When $\gamma = 1$, and S equals one unit, then $S + \gamma S$ equals two units of length. The only valid bar or space which can precede a bar or space is, therefore, by definition S or $S + \gamma S$. Therefore, the interval of space between control pulses or data pulses which can precede the next interleaved data or control pulse interval would be as follows:

For a data pulse interval of three units, the pattern in line B can have only a two unit or three unit total interval in the control pulse interval which precedes it in interleaved fashion. The control pulse interval of four units is not possible with a one unit — two unit data pulse interval as illustrated in line B as is made clear in line E. The four unit control pulse interval is not possible with a one unit — two unit data pulse interval since the preceding bar or space which will form the control pulse interval can only be one or two units wide. If the preceding bar or space is one or two units wide, the resulting control pulse interval measured as shown in line E can only exhibit a total length of two or three units, not four units. If the control pulse interval happens to be two units, it can only be produced by a preceding bar or space of one unit in width. This bar or space can only be a part of the preceding data pulse interval configured as a 2 - 1 or a 1 - 1 unit sequence. A control pulse interval equal to 2 is not ambiguous with any other control pulse interval since it can only be produced one way. Therefore, the combination of a 2 in the control pulse interval and a three unit length at the $i = 2$ position in the data pulse interval as illustrated in line B and E will still uniquely identify the pattern in the data pulse interval such as line B as being the 1 - 2 pattern, not the 2 - 1 pattern, in total length since the preceding control pulse interval separates it from all others as will appear shortly.

If the control pulse interval happens to be a three unit control pulse interval, it can only be produced by a 1 - 2 or a 2 - 2 data pulse interval preceding a 1 - 2 data pulse interval in line E. If one of these two forms occur in the control pulse interval, they will uniquely identify the 1 - 3 data pulse interval form as illustrated in line B instead of the 3 - 1 interval illustrated in line C since either of these two combinations in the data pulse interval that precedes the data pulse interval in question can only occur in one way if they are followed by a 1 - 2 data pulse interval. They will uniquely identify the 1 - 2 data pulse interval in line B instead of the 2 - 1 interval of line C. This is so, since if either of these data pulses intervals 1 - 2 or 2 - 2 occurs, a control interval in the form of the code symbol in line C would be of the length four units and therefore would be different and easily distinguishable from the three unit control pulse interval which would occur if the same type of code bars were written in front of the pattern in line B.

Continuing to line F, the other ambiguous form of three total units length in the data pulse interval is illustrated. The valid control pulse interval which can precede such a pattern can only be three or four units in length since a control pulse interval equal to two units is not possible even with the minimum width bar or space which can precede the data pulse interval in line F where the preceding bar or space can only be one or two units wide. If the control pulse interval happens to be four units in length, as would be produced by any 1 - 2 or 2 - 2 preceding symbol pattern, no ambiguity will result since there is no other control pulse interval of four units in length that occurs in combination with one of the ambiguous patterns in B and C of FIG. 14.

If, however, the control pulse interval happens to be three units in length, it can only be produced by a preceding 2 - 1 or 1 - 1 bar symbol in the preceding unit sequence. If either of these occurs, they will uniquely identify the 2 - 1 data pulse interval form illustrated in line C instead of the 1 - 2 form illustrated in line B. This is so because the combination 2 - 1 or 1 - 1 (which must be in the preceding symbol in order to create a three unit width control pulse interval for the data pulse interval illustrated in line F) would generate, if used to precede the data pulse interval illustrated in line E, a two unit control pulse interval which would not be an ambiguous form.

Figures 13A, 13B:
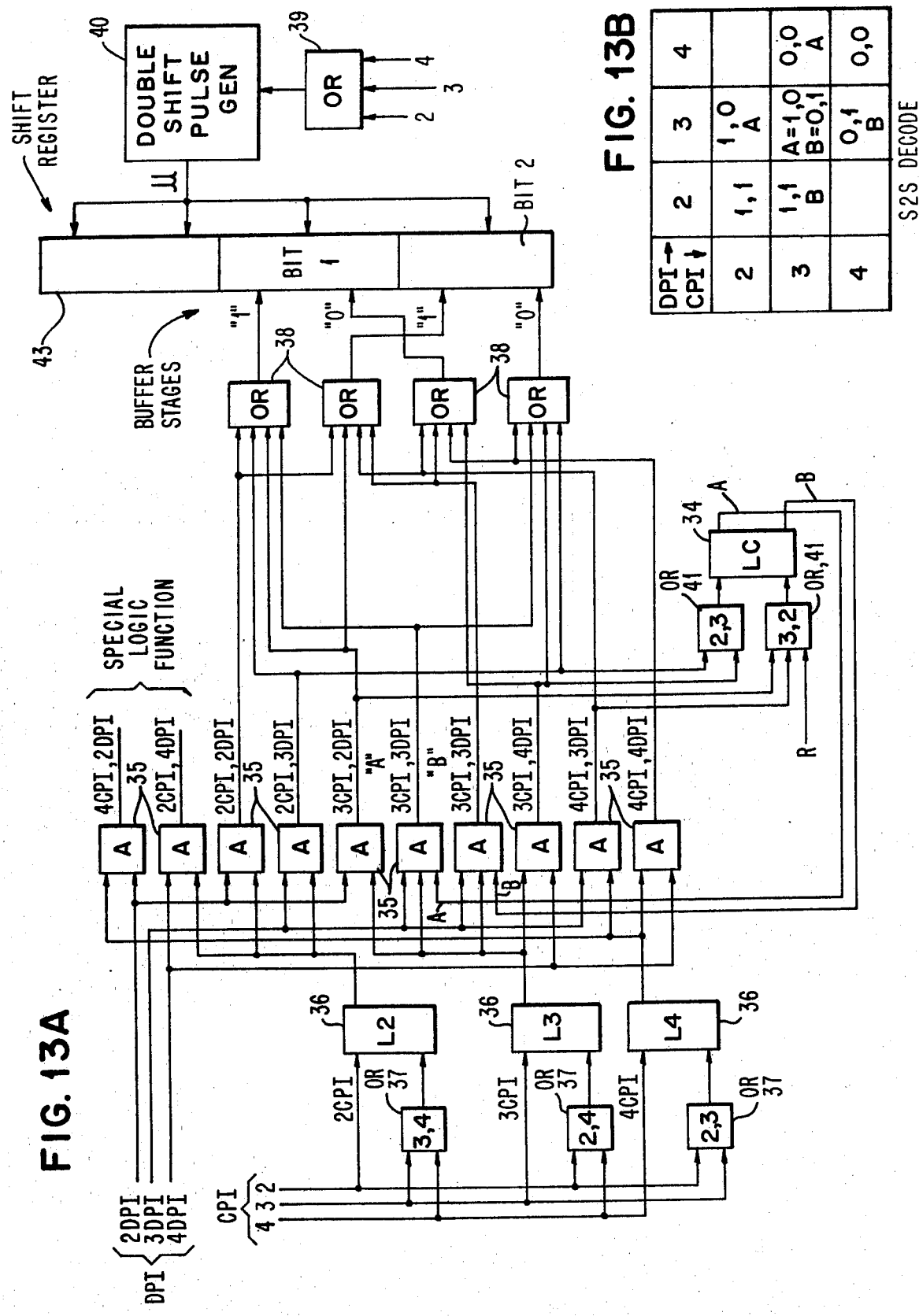
FIG. 13A illustrates a logical table of decode contents for an S2S code.
FIG. 13B illustrates the matrix arrangement embodied in the logic circuit of FIG. 13A.

The matrix in FIG. 13B is drawn for a general two width code and the A and B states are labeled appropriately in the matrix in accordance with these rules so that the alleged ambiguity which exists when a three unit data pulse interval occurs can be resolved.

Similar rules can be generated for a three different width (P=2) element code system, or more. The general procedure is to draw out all of the possible bar and space combinations, with repeats allowed, as defined by the 2P + 1 formula earlier derived. The ambiguous combinations, if any, will then be identified as resulting in equal data pulse interval lengths. The ambiguities may be resolved by reviewing what the preceding data pulse interval patterns happen to be, as was illustrated above for the general two-width element code system.

Returning to FIG. 9, the general length of an interval of two combined bar and space widths is, as was derived, $T_{n_i} = 2S + [i_n - 1] \times \gamma S$. The 2S term in this expression has previously been noted as the minimum combination of any two widths and is equal to $T_0$. Therefore, the generalized length of any predicted interval can now be written as $T_{n_i} = T_0 [B_i]$ where $B_i$ is a factor of multiplication which is dependent on the value $i$, the index number of an interval of length at which a predicted pulse may possible occur, where $i$ is chosen from the range $1 \leq i \leq 2P + 1$.

If a window is to be constructed about a predicted location $T_{n_i}$, the generalized form of an expression for predicting the start and end points for the search window is given by $T_{n_i} = [B_i \pm \alpha] T_0$. Returning to FIG. 12, line $h$ illustrates a general combination of two bar and space elements, in the case chosen for simplicity, each bar and space element having a width $S + \gamma S$. The total length of the interval encompassed by the two bar and space elements is therefore $T_0 \times B_i$ and this, in turn, as developed above, is equal to $2S + (i_n - 1) S$. But, $T_0 = 2S$ by definition and therefore it may be found that, substituting the value of 2S for $T_0$, that $$B_i = \frac{2 + \gamma(i-1)}{2}.$$

The expression derived above provides a length value for each position of a future pulse transition of like polarity and predicts a segment or window of semiwidth $\alpha T_n$. However, these coefficients only account for a given interval window with $i$ value 1, 2, 3, etc., assuming that the basic interval $T_0$ is used as a base for projecting the location of future pulses. To generalize the expressions further, it is necessary to include the effects which are introduced if the base width of an interval on which projections are made is not a minimum interval $T_0$, but is some other interval, such as the last interval actually obtained during code processing.

The interval used as such a base or reference will be termed the $j^{th}$ interval to distinguish it from the $i^{th}$ interval which is being projected. Therefore, $j$ will take on the values 1, 2, 3, etc., up to the maximum 2P+1 as does $i$, but $j$ will be defined as the index number of the interval of all possible intervals in which the previous pulse was found; therefore, $j$ represents an index number for the previous interval experienced in processing the the code which will now be used as the base interval for projecting new values of interval locations.

If the $j^{th}$ interval happens to be some interval greater than the minimum interval $T_0$, then the expression $T_{n_i} = [B_i \pm \alpha] \times T_0$ will have to be scaled back to the minimum reference interval. This can be accomplished by multiplying the actual interval length now utilized as a reference by a reference scale factor $R_{j,\gamma}$, where $R_{j,\gamma}$ is defined as being equal to the actual reference interval T divided by $T_0$ and where the actual interval utilized as the reference interval will be given in general by $2S + (j-1) \gamma S$, $j$ being the index number of the interval in which a pulse was found which defined the length of the reference interval $T_{reference}$: $R_{(j,\gamma)}$ is therefore equal to $2S + (j-1) \gamma S/2S$ which is equal to $T_{ref}/T_0$ and $j$ is the number of the window or interval in which the actual reference pulse was found which is now chosen to define the length of the reference interval as a base for new projected pulse locations.

The expression for the scale factor R simplifies to $$R_{j\gamma} = \frac{2 + (j-1)\gamma}{2}.$$

If a constant reference interval other than the minimum $T_0$ is utilized, than the reference actually used times the scale factor would equal the minimum width $T_0$, or in general, $T_n$ would equal $$\frac{T_{ref}}{R} \times [B \pm \alpha].$$

This is an example of scaling the reference interval to the basic minimum interval $T_0$ since, by definition, the reference scale factor is $T_{ref}/T_0$ where a reference other than the minimum interval $T_0$ is utilized. Alternatively, the expression could be written $T_n = T_0 \times [B_{ij\gamma} \pm \alpha_{j\gamma}]$ wherein B and $\alpha$ would be scaled by dividing the expressions previously developed for B and for $\alpha$ by the scale factor R. This results in $$B_{ij\gamma} = \frac{2 + [\gamma(i-1)]}{(2-\gamma) + j\gamma}$$

and for $\alpha$, $$0 \leq \alpha_{j\gamma} \leq \frac{\gamma}{2[(2-\gamma) + j\gamma]}.$$

These changes yield the Table IV formulas above for a two-width code.

It will be recalled as developed above, that a reference width of time $T_r$ can be defined in terms of a minimum interval $T_0$ and a scale factor R such that $T_r/T_0$ equals the scale factor R. As was derived above, the scale factor R is equal to $2+(j-1)\gamma /2$ where $\gamma$ is as defined above and $j$ is the index number of the window defining the interval of the reference width selected, assuming that one of the normally occurring possible valid intervals will be selected as the reference interval. It will be recalled that the location of possible valid pulses which can be predicted $T_i$ will be equal to $$T_0 \times \frac{[2 + (i-1)\gamma]}{2}.$$

The width of an interval between two similar polarity pulses $T_n$ has already been defined as a function $AxT_{0j\gamma} [B_{ij\gamma} \pm \alpha_{j\gamma}]$ and $\alpha_{(j\gamma)}$ has already been defined above as $\gamma$ divided by $2 \times (2-\gamma+j\gamma)$ and $T_{0_{(j,\gamma)}}$ has been defined above as equal to $$T_0 \frac{[2 - \gamma + j\gamma]}{2}.$$

It is known also that the width of a search gate window is always defined as $2\alpha T_n$ or $(2T_{0j,\gamma})(\alpha_{j,\gamma})$. Therefore, by substituting values for $\alpha_{j,\gamma}$ and simplifying, $$\alpha = \frac{\gamma}{4}$$

for all possible cases of any two width constructed code.

Turning to FIG. 12, these relationships are defined further and will be re-emphasized here.

In FIG. 12, the top line illustrates a minimum interval between two adjacent (unlike) pulse transitions as S. This is the minimum interval element which makes up one of the code bar (or space) elements for a given code. Two of these elements placed adjacent one another will create the minimum time interval $T_0$ between two like pulses and this is defined as the minimum transition interval in the code set.

The next size bar element will be $S + \gamma S$ where $\gamma$ is defined as $\Delta W/S$ and $\Delta W$ is the amount by which the next largest code bar element exceeds the size of the minimum code bar element. In the case drawn, $$\frac{\Delta W}{S} = 1,$$

or $\Delta W = S$. Therefore, $\gamma = 1$, by definition, in the figure drawn. In the lower portion of FIG. 12, various code elements which can be constructed from the code bars S and S+γS placed in conjunction with one another in any order are shown. It may be seen that three possible valid intervals or pulse positions can be created. This is given by the formula $i = 2P + 1$ where P is the number of bar elements in the code different from the minimum. In this case, P = 1 so the number of windows required, or the number of possibly valid pulse positions, equals three.

In FIG. 12 just referred to, it can be seen that the interval of space between the minimum code interval, $T_0$, and the next largest code interval, S plus a code bar made of S+γS, is an amount γS. The maximum width of a search window which can be constructed to search for a pulse occurring at the $i = 1$ or $i = 2$ or $i = 3$ position is defined as $2\alpha T_n$. As can be readily seen, the total width of a search window will always be $2\alpha T_n$. It has been shown that α is always equal to γ/4; therefore, the length of an interval $T_n$ can be measured in α units. For example, if a search gate width is $2\alpha T_n$ and α does equal γ/4, the search gate width is equal to $$\frac{\gamma}{2} T_n$$

or $T_n$ = two search gate widths divided by γ. For the case drawn where γ = 1, $T_n$ = two search gate widths, or four α units. This is true regardless of the value of γ and therefore is true for all possible two width bar code constructions. In FIG. 12, since $T_n$ = four α units for all cases, the start of the first gate for isolating the pulse possibly occurring at the $i = 1$ position will be at ¾ $T_n$, or 3 α units. The end of the first search gate and the start of the second search gate, which are contiguous with one another, will be at a position 5/4 $T_n$, or 5 α units. The end of the second search gate and the start of the third search gate will be at 7/4 $T_n$, or 7 α units, and the end of the third search gate and the beginning of the fourth, if one were needed etc., will be at 9/4 $T_n$, or at 9 α units, for all cases. This is true for all two width bar code constructions. It may be easily expanded for bar code constructions having more than two widths as will be appreciated from the fact that $T_n$ always equals 4 α where α is always γ/4.

Proceeding now to a description of a preferred embodiment of an apparatus for carrying out the present method, reference will be made to FIGS. 10A-C. The logic circuitry in FIGS. 10A-C has been designed to operate for any 2-width bar code, that is any code for which P = 1. The apparatus has been configured to perform a first order velocity correction, but modifications of the apparatus will be described for carrying out second order velocity corrections (correct for high acceleration effects), using essentially the same basic apparatus.

As was discussed in some detail earlier, it is necessary to provide a reference width interval. The reference is used as a base for the projected locations of segments of search times for possible valid pulses in terms of multiples or increments of the reference interval. Since, in a first order velocity correction system, the previous interval actually detected will be utilized as a reference interval for the next set of predictions, it is necessary to scale either the time measurement made to the base reference or to select a different set of algorithms for predicting the valid pulse locations. The different sets of algorithms which would be selected are shown in Table IV and are actually subsets of the general expressions given, but specific values for the $B_{(i,j,\gamma)}$ term are used instead of the general expression. The specific values of $B_{(i,j,\gamma)}$ are scaled to the reference width used (the last interval found) and the resulting algorithms, for a code where γ=1 (a two-to-one width ratio code such as S2S) is shown in Table IV above. The appropriate algorithm would be chosen depending on the interval in which the last data pulse was found. This would give values for j. The values for i and γ are selected with γ determined by the code used, as will appear in detail later. However, it is easier to use the general algorithms of Table I than to select new algorithm subsets for each prediction of search segment locations. This requires that the intervals measured be scaled first so that $B_{(i,j,\gamma)}$ can be left in the general form.

Figures 10, 10A:
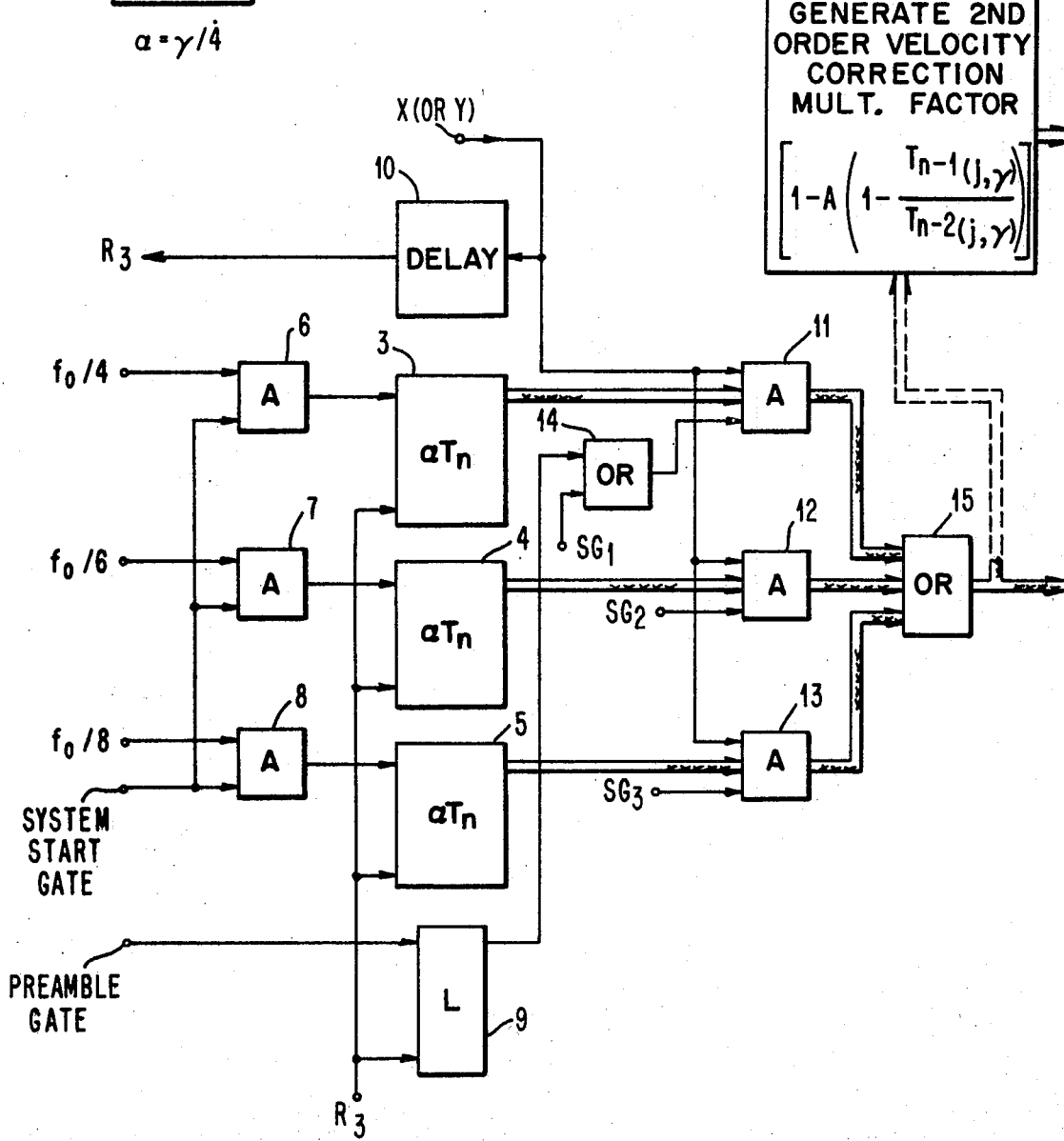
FIGS. 10A through 10C illustrate the circuitry of a preferred embodiment of the decoder apparatus.
Figure 10B:
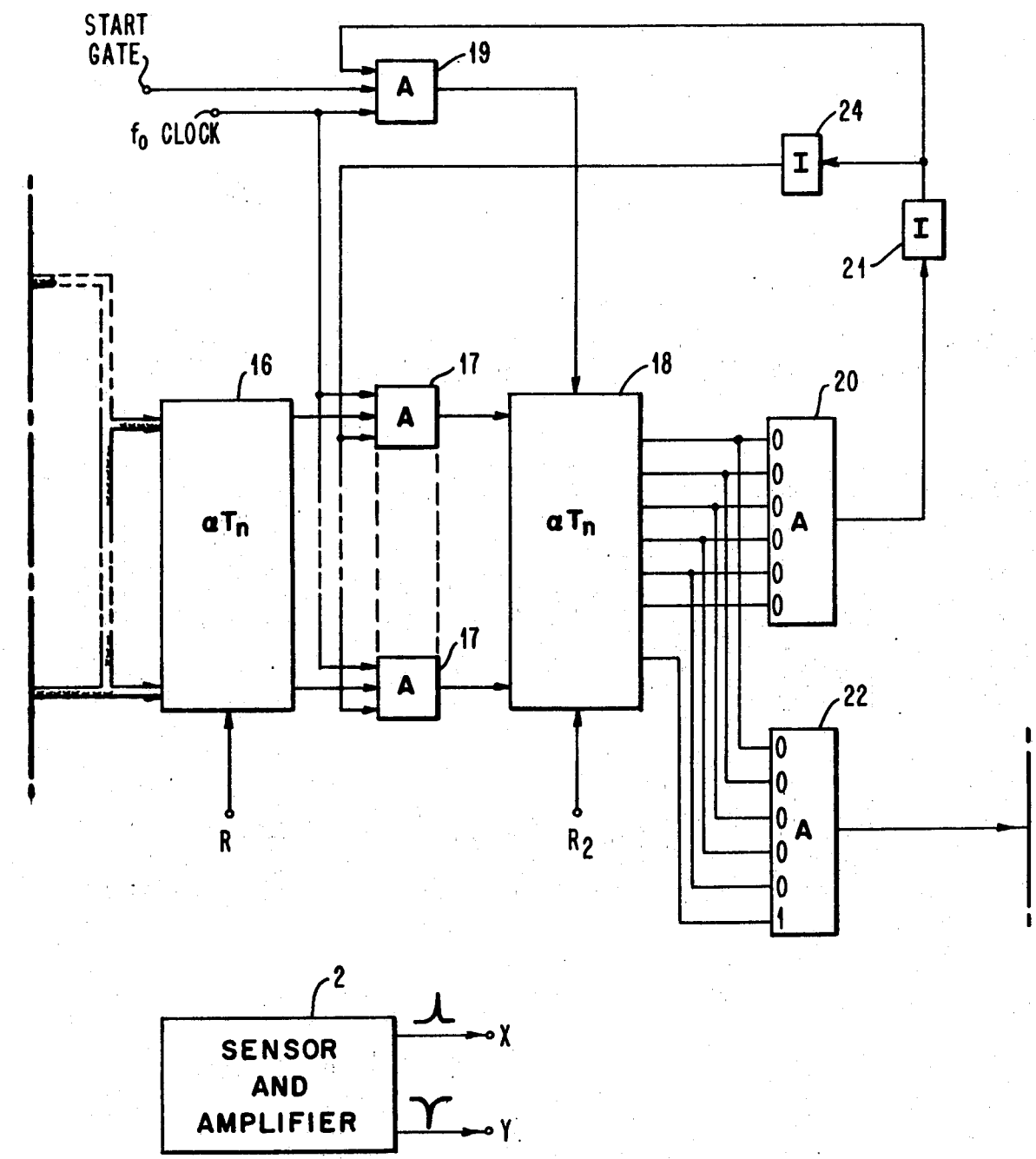
Figure 10C:
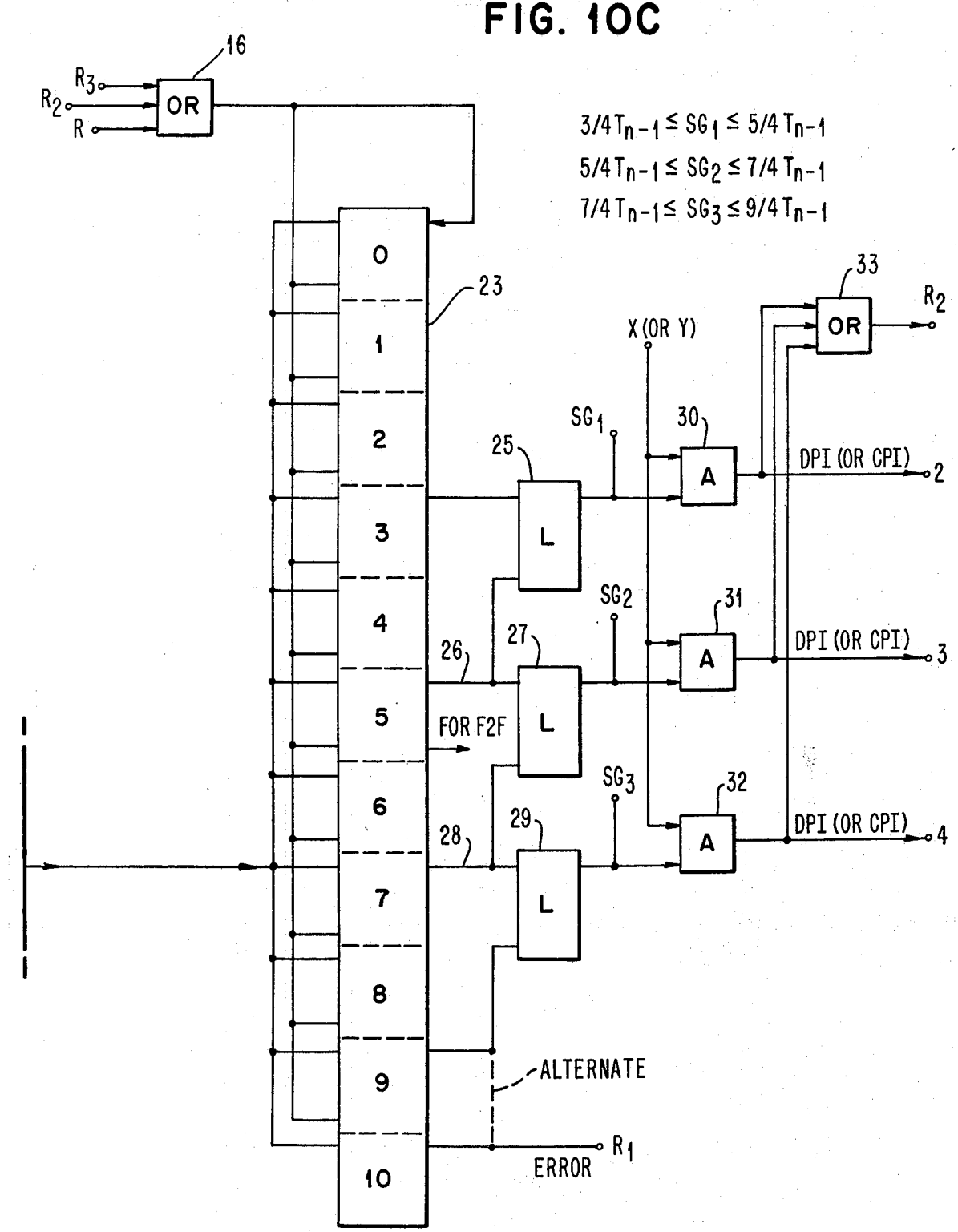

The apparatus in FIGS. 10A through 10C has been constructed to prescale the interval lengths, (which are the only valid ones) so that, upon the occurrence of a pulse within one of its predicted windows, an already scaled length interval corresponding to the interval bounded by the pulse which has been located may be selected in its scaled dimension for use as a reference for the following pulse position predictions.

The measurement of time or distance from a given point to a predicted location or the occurrence of a pulse is accomplished in FIGS. 10A-C by counting clock pulses coming from a timing unit 1 at one of several frequencies which will be described. A sensor and amplifier unit 2 is shown only in block form in FIG. 10B and would comprise a suitable magnetic, optical or other electrical sensor together with the necessary amplifiers and wave shaping circuits to produce pulses from the leading edge given on channel X and from the trailing edges of signals given on channel Y.

It will be arbitrarily assumed that the leading to leading edge interval between two pulses on channel X will define a data interval. This interval spans one bar and one space selected from a code element set in which two possible bar or space widths are available.

The pulses on channel Y from sensor amplifier 2 will be the trailing to trailing edge interval pulses and will be interleaved on a one for one basis, as is obvious, with the positive going pulses on channel X. The pulses on channel Y will be aribitrarily assigned significance as control pulses.

FIGS. 10A-C illustrate circuitry for handling only the pulses coming from channel X where the data pulse is, an identical circuit figure would be utilized for handling the control pulses from channel Y. An alternative decode method can be used which requires only the X or Y circuit as will be explained later and this results in a substantial hardware savings.

As was developed above, it has been found more convenient to count data window or control window intervals, or segments, in α units than to count individual clock pulses coming at a frequency FO from the timing unit 1. The number of pulses counted during the interval between two pulses coming from channel X in the sensor amplifier 2 is a digital measure of the analog time or distance contained between the two positive going pulses on channel X.

In general, the number of pulses $N_0$ which will occur at the basic clock frequency $F_0$ during a time interval $T_0$ will be $N_0 = F_0 \times T_0$. The frequency $F_0$ will be chosen such that the number of pulses contained in a minimum interval of time (space) $T_0$ occurring in the code will be on the order of a hundred (more or less) pulses per interval, so that a resolution of one part in a hundred, or better, can be maintained in locating the occurrence of a given pulse on channel X and/or Y.

It may be seen that, in general, for a reference interval of space or time equal to $T_j$, there will exist a frequency $F_0 \times T_j$ which will equal at least a number $N_j$ of pulses equal to or greater than 100.

It will be readily appreciated that if pulses on channel X occur spaced apart wider than a reference interval $T_j$, then the count $N_i$ occurring over the interval will be some number $N_i$ greater than $N_j$. This possibility leads to some complication, since it would be necessary to calculate, or predict in advance, such possible numbers $N_i$ for each possible pulse location and then to count clock pulses at the frequency $F_0$ until a count close to that anticipated for the predicted position of a possible pulse had been reached. Then a data or control search window would be opened to admit any possible pulse occurring at that location, while counting would be continued. This is a cumbersome technique.

A less costly and simpler approach is to simply operate several counters, but to operate the counters at different rates so that, at each anticipated pulse position, an appropriate counter will have reached the same count $N_j$ as would be reached by counting the pulses at frequency $F_0$ for a time interval $T_j$ equal to the reference interval.

This, in effect, accomplishes a "scaling in advance" of the intervals which are being encountered between pulses on the X channel from sensor 2. FIG. 11 illustrates the principles.

As shown in FIG. 11, an arbitrary bar code having a minimum transition interval S and a P value of 1, that is, there is one interval having a different width than the minimum, is shown. In FIG. 11, the minimum interval between two like pulses is equal to 2S (or $T_0$) as has previously been described, and the width of the next interval which is different from S is equal to $S + \gamma S$. The resulting combinations of S and $S + \gamma S$ are illustrated in the three top lines of FIG. 11 and result in pulse position locations at three different locations which may be isolated by the search gates about the index positions $i = 1$, $i = 2$, and $i = 3$ in line $e$ of FIG. 11.

The elapsed times from the initial starting pulse to the locations of a possible valid pulse are identified as $T_{i=1}$, $T_{i=2}$, and $T_{i=3}$. In line $e$ of FIG. 11, a string of arbitrary frequency pulses occurring at a clock rate $F_0$ are illustrated with a certain number of pulses $N_j$ encompassed within a length of time interval $T_j$ equal to a reference interval.

The reference interval $T_j$ need bear no specific relationship to any of the other intervals in the code, although it is more convenient to choose a reference interval $T_j$ equal to one of the possible valid occurrences within the code system. It is desired that $N_j$ be approximately 100 or more pulses so that the resolution of locating a pulse occurring at the reference interval $T_j$ will be one part in a hundred or better. The number of pulses $N_j$ may be defined as the frequency of a reference $F_j$ times the reference interval $T_j$.

As discussed above, it is also desired that other frequencies be chosen for the possible occurrences at intervals $T_{i,j}$, where $i, j = 1, 2, 3$ such that, if a pulse occurs at one of its valid locations, a count equal to $N_j$ will be generated by a counter counting at a frequency $F_1$, $F_2$, $F_3$, etc., as appropriate, at the point in time when a pulse occurring at one of those valid locations has been reached. It is quite clear that frequency $F_3$ will be lower than the frequency $F_1$ since the time interval $T_3$ is longer. The exact relationship among the frequencies may be more accurately defined in terms of the reference frequency and reference interval by relation to the scale factor as will be developed below.

Since, as will be explained shortly, counters 3, 4 and 5 in FIG. 10A are only counting every fourth, sixth, or eighth pulse in the embodiment shown for a 2-width code, the capacity of the counters (and also of all the other logic) can be a good deal smaller than would be required to count the frequency $F_0$ pulses. Also, since the counters are counting at "scaled rates" and one will attain the same number of count pulses $N_j$ as the possible pulse locations are reached, the content of each counter 3, 4, or 5 is a scaled measure of an interval $T_n$ expressed in $\alpha$ units.

a first order velocity correction is thus built into the system described in FIGS. 10A-C since, as the content of the counters is continuously monitoring a scaled representation for the actual length of an interval being encountered. It can quickly be seen that the use of the contents of the appropriate counter corresponding to the pulse position in which a pulse is actually found will yield a scaled measurement for $T_n$, expressed in $\alpha$ units, for use in a prediction of the next succeeding three possible pulse locations. The circuit in FIGS. 10A-C utilizes just such a procedure.

Turning now to FIGS. 10A-C, it may be observed that the basic clock 1 produces output pulses at a frequency $F_0$, $F_0/4$, $F_0/6$, and $F_0/8$ for a two bar width decoding circuit. These output frequencies are determined because they are chosen to create pulses at each position defining an $\alpha$ unit and at a frequency such that a count of $N_j$ will be reached in one of the counters at each possible pulse position. For convenience, $\gamma$ has been chosen to be 1 in FIG. 10. The output frequencies may be defined generally as $$\frac{F_0}{R_i} \times \alpha$$

where $$\alpha = \frac{\gamma}{4}.$$

The pulses coming from the various outputs in clock 1 therefore represent pulses occurring at $\alpha$ unit increments of a given interval $T_n$. These $\alpha$ units are counted in separate counters 3, 4, 5 whose inputs are controlled by AND gates 6, 7, and 8, respectively, which gates are controlled by a basic "system start" gate signal applied as shown. The count in each counter 3, 4, or 5 will be, at any point in time, equal to some factor of the basic frequency which is scaled according to the scale factor R as noted beside clock 1.

At the occurrence of the first possible pulse position, the count contained in counter 3 will be equal to one $\alpha$ unit which would be required, by repetative use, to exactly measure off a length interval $T_n$ equal to the minimum interval $T_0$ at which a possible pulse can occur. The counts in counters 4 and 5 will be lower since these counters count at lower clock frequencies which have been scaled down by the scale factor R. If a constant reference measurement is to be used rather than a first order velocity correction technique, registers 4 and 5 are not needed and reg. 3 would contain $\alpha T_f$ where $T_f$ is the fixed reference time. When the next possible pulse position is reached, counter 4 will have reached the same count $N_j$, but the interval of space $T_n$ will be equal to the second possible interval defined at $j=2$, and so on for succeeding possible pulse positions.

To initialize or start operation of the embodiment shown in FIG. 10A, it is necessary to process a bar code which has a preamble symbol containing in it a reference time interval between two like pulses, or alternatively, if a fixed reference is used, to detect the first pulse in the stream. For a preamble system, however, this is accomplished by writing a preamble symbol at the start of each string of code to be processed and then, when the first pulse from the string of code occurs (which is the start of the preamble symbol) the preamble gate latch 9 can be energized as shown and the start gate signal can be given as shown.

The counters 3, 4 & 5 will thus begin counting a various clock frequencies as shown in $\alpha$ units and will measure off the extent of the preamble symbol interval. When the pulse corresponding to the end of the preamble symbol occurs, i.e., the polarity pulse of the same polarity which begins and ends the preamble symbol and begins the start of data occurs, the X pulse is applied as shown in FIG. 10 to several points.

First, the X pulse goes through a delay unit 10 to create the $R_3$ reset signal. This reset signal resets latch 9 and ends the measurement, after a short delay produced by the delay unit 10, of the preamble symbol interval. The count contained in one of the counters 3, 4, or 5 will be outputted through its AND gate 11, 12, or 13 respectively, as the initial reference interval taken from the preamble symbol interval.

The selection of which of the counter contents is to be used as the reference interval is governed by the preamble character or the fixed reference. It is a matter of choice and is arbitrary. In FIG. 10A, as illustrated, a two slot time reference (or a minimum transition interval $T_0$ reference) is chosen as being selected by OR gate 14 controlled by latch 9. AND gate 11 will therefore be fully activated and the contents of counter 3 will be outputted on N lines parallel through OR gate 15 into register 16 which has previously been empty. The count now residing in register 16 will be a count expressed in $\alpha$ units which represents the length of the preamble symbol interval expressed in $\alpha$ units. Register 16 holds the count until a reset signal R is applied as will be described later.

At the occurrence of the next pulse at the frequency $F_0$, the contents of register 16 will be outputted through AND gates 17 on N lines in parallel to a counter 18. Counter 18 will be stepped to count down its contents at a frequency $F_0$ with each occurrence of an $F_0$ clock pulse as controlled by AND gate 19 which is initialized by the occurrence of a clock pulse, the presence of the start gate system control, and the inverted output from AND gate 20 which is inverted in inverter 21 (for a purpose which will be described later).

As is obvious, the $F_0$ clock rate is (at least) four times higher than the initial count rate in counter 3; therefore the contents of counter 18 will be counted down to 0 in the exact amount of time defined as one $\alpha$ unit; in this case it is equal to $T_0 \times F_0/4$ for the case where $\gamma = 1$ which has been drawn. When counter 18 has been counted down to a 1 in the least significant bit position, AND gate 22 is activated to apply a shift pulse to shift register 23, which was initially set with a 0 in its first cell, to move that 0 to the next cell as an indication that one $\alpha$ unit of time has elapsed following the end of the preamble symbol.

When an all zero content in counter 18 is reached, AND gate 20 is activated and, through inverter 21, deactivates AND gate 19 to end the counting down process momentarily. A second inverter 24 reinverts the down level to an up level and reactivates AND gate 17 to reapply the count contained in register 16 to counter 18 whereupon a non-zero content in counter 18 occurs, deactivating AND gate 20 and re-enabling the countdown process. The contents of counter 18 will be counted down again and when a LOB 1 content is reached, AND gate 22 will again be activated to cause another shift pulse to be applied to shift register 23 indicative of the fact that two $\alpha$ units of time elapsed since the end of the preamble interval.

The process continues as described until a third $\alpha$ interval of time following the preamble interval has elapsed. At this point, an output is produced from the third cell in shift register 23 to activate latch 25. Latch 25 produces an output signal identified as $SG_1$. This is the start of the first search gate which occurs about the two slot time position (equal to $T_0$) or at the minimum interval window position or segment. This signal is applied as shown through OR gate 14, in this case, to AND gate 11 to gate whatever count contents is then resident in counter 3. This count is used to fill register 16, through OR gate 15, with a new count representative of the length, expressed in $\alpha$ units, of the interval actually elapsed at the point in time when (and if) another X signal is produced indicative of the fact that a pulse of the same transition polarity has occurred within the window. This can be seen from the control of the X signal input to AND gate 11 in this case, and from the fact that the remaining control AND gates 12 and 13 are not activated since search gates 2 and 3 have not yet been activated.

Assuming that an X pulse does not occur, operation will continue with shift register 23 being shifted through additional positions until the fifth $\alpha$ unit interval is encountered, whereupon an output will be produced on line 26 to deactivate latch 25 to activate latch 27 and raise the second search gate window or segment signal. This is applied to AND gate 12 to condition it so that, if an X pulse occurs during this segment or search gate window, the output of counter 4 will be applied through OR gate 15 to register 16 as a measure, in this case scaled by a reference factor, of the interval actually encountered when the pulse occurred in the second possible position. Assuming that such a pulse does not occur, counter 18 will continue to cycle as before and shift register 23 will continue to be shifted until the seventh $\alpha$ unit is encountered.

At the occurrence of the seventh $\alpha$ unit, an output on line 28 will occur which deactivates latch 27 and activates latch 29, raising the third search gate segment or window. The output of the third search gate window is applied to AND gate 13 to condition it so that, if an X pulse occurs now in the final location which is possible with a two width code, the count in counter 5 will be applied through OR gate 15 to register 16 as the measure, in $\alpha$ units, of the interval encountered.

If no X pulse is detected, during the time elapsed between the indication of the seventh $\alpha$ unit and the end of the ninth $\alpha$ unit as indicated in shift register 23, an error has occurred. At the end of the ninth $\alpha$ unit in register 23, latch 29 is deactivated and, if shift register 23 is allowed to run due to the fact that no pulses have been found within any of the search gates, eventually cell 10 of the shift register will be activated indicative of the fact that a tenth α unit has been elapsed and an error signal and a reset signal R₁ will be generated.

In general, however, an X pulse will occur somewhere within one of the three search gates and one of the contents of counters 3, 4, or 5 will be outputted into register 16. Of course, due to distortion or slight accelerations, the actual signal pulse X may not occur at the precise instant defined by the equation for $T_i$. However, the pulse will occur in general within its segment or window $SG_1$, $SG_2$, $SG_3$, etc. The number of α units that have elapsed at the point that the pulse is actually encountered will therefore be a relative measure of the actual length of the interval encountered and can serve as a new reference length for predicting new possible valid pulse locations for the next interval. Since the counters count at different rates scaled according to the possible locations at which pulses can occur, a prescaled count is resident in each counter at the time when the actual pulse occurs. The output of the appropriate counter, as controlled by the search gate or segment activated during the time the pulse occurs, will therefore be used as an appropriately scaled (lengthened or shortened) count due to the actual time at which the pulse occurred during a search window. This will be for use in predicting the next three possible valid locations of the next pulse positions.

Returning to FIG. 10, it may be seen that any of the reset pulses R1, R2, or R3 will cause deactivation of counters 3, 4, and 5 and a reset of shift register 23 so that operation can begin anew. R1 is the error signal and R3 is the delayed input signal from the occurrence of any X pulse which reinitializes the counters to count again and which reinitializes the shift register to begin again from each occurrence of an X pulse, whether it be in the data stream or in the preamble symbol transition stream.

The occurrence of an X pulse also activates a portion of each AND gate 30, 31, or 32 and, depending on which latch 25, 27, or 29 is activated at that point in time, an output pulse indicative of the occurrence of a signal X pulse within the search gate identified as occurring at the end of slot time 2, 3, or 4 for a code in which γ = 1 will be produced. Through OR gate 33, the reset signal R₂ is also produced when this occurs.

Reviewing the operation of FIG. 10, it may be seen that the outputs 2, 3, or 4 produced at the right hand edge of FIG. 10C are indicative of the fact that an X pulse (a DPI) identified with data has been found for a code in which γ is chosen as 1, for example, so that pulses nominally occur at the end of slot time 2, 3, or 4, has been produced. An identical circuit is utilized for the Y pulses coming from sensor amplifier 2. The Y pulses, as previously noted, are identified as control signals (CPI) and will be utilized as discussed below in combination with the X signals. What is important to note for the present, is that the circuit, while drawn specifically with regard to the frequencies used and the outputs identified as 2, 3, and 4, is shown, it may be utilized for a generalized code in which γ is chosen as 1, (and therefore, the outputs occur at slot times = 2S, 3S, or 4S).

The circuit illustrated will work equally as well for any value of γ. It is simply easier to describe the frequencies $F_0/4$, $F_0/6$, $F_0/8$, etc., in the case where a convenient value of γ is chosen and it is easier to represent the outputs which occur from the X or Y channel indicating circuit as described in FIG. 10 as occurring at the 2, 3, or 4 slot time positions.

The same type of outputs, indicative of a control pulse on the Y channel appearing at its slot time position 2, 3, or 4, will be produced by an identical circuit to that shown in FIGS. 10A–C processing the output from sensor 2 which come on the Y channel. A modification of the system is shown to provide second order velocity corrections. This is shown in dashed lines in FIGS. 10A and 10B by the inclusion of the algorithm computation unit 60. This unit generates a multiplication factor for the value of $T_{n-1G, \gamma}$ shown in Table I as:

$$[1 - A(\frac{T_{n-1G, \gamma}}{T_{n-2G, \gamma}})].$$

It is clear that the output of OR gate 15 would be sent to unit 60 and from unit 60 to register 16 in this modified system, where the second order velocity-corrected count representative of $T_{n-1G, \gamma}$ would be stored for counting-down timing of the α unit search segments.

Turning to FIG. 13A, a decode logic for extracting the data content of the signal stream is shown. The outputs from the appropriate X and Y pulse logic circuits 10, configured as in FIGS. 10A–C, are applied as shown at points 2, 3, and 4 for the data pulse intervals (abbreviated DPI) and 2, 3, and 4 for the control pulse intervals (abbreviated CPI) as shown. These control and data pulse inputs are applied to a series of control latches and AND gates. The latches and AND gates are configured to reconstruct, in an equivalent logic form, the "decode matrix" shown in reduced size in FIG. 13B The decode matrix identifies data in accordance with an S2S code (a width and two-width code) which is one type of code which is constructed when a γ value equal to 1 is chosen as described above.

As was developed in greater detail earlier, certain ambiguities in the matrix exist as to what the data content might be when the CPI=3, DPI=3, decode signals are obtained. As will be developed below, the ambiguity is resolved by selecting whenever a CPI2, DPI3 or CPI3, DPI4 signal is obtained in the stream of data, an A state and selecting a B state whenever a CPI4, DPI3 or CIP3, DPI2 set of signals is obtained. Then, when the CPI3, signal set is obtained, the content is decoded depending on whether an A or a B state is then being maintained in the system. Latch 34 provides this function in producing A and B outputs.

In FIG. 13A, the following operation is performed.

AND gates 35 are controlled by the coincidence of DPI pulses and CPI pulses in accordance with the logic matrix values illustrated in FIG. 13B. The AND gates 35 have written by them the control pulse interval designation and the data pulse interval designation to which they correspond. The outputs of AND gates 35 are applied through the OR gates 38 to generate the 0 and 1 dibit combinations for application to the buffer stages of an output register 43. The output shift register is shifted twice by a double shift generator 40 which is driven through OR gate 39 by the occurrence of a 2, 3, or 4 signal from the control pulse interval to shift out the last two bits of data read.

The control pulses are applied to latches 36, which control the activation of groups of AND gates 35, according to whether a 2, 3, or 4 control pulse interval has been detected. Latches 36 are deactivated through OR gates 37 by the occurrence of a pulse which does not correspond to the particular gate activation function, that is, the gate which is activated to the on condition by control pulse interval 2 is deactivated whenever a control pulse interval 3 or 4 occurs, with similar provisions being made for the other interval combinations for the remaining latches.

The ambiguity which results in the occurrence of a 3, 3 control pulse data sheet interval is accommodated by initially setting a control latch 34 to the B output condition so that, on the first occurrence of a 3, 3 interval signal, the B output will activate the particular AND gate 35 which has the B input, and the appropriate decode according to the matrix table will be made. If, however, a 3, 4 or 2, 3 control pulse-data pulse interval sequence should occur, latch 34 will be set to the A output condition. If a 3, 2 or 4, 3 control pulse-data pulse interval sequence should occur, latch 34 will be set to the output condition.

Figure 15:
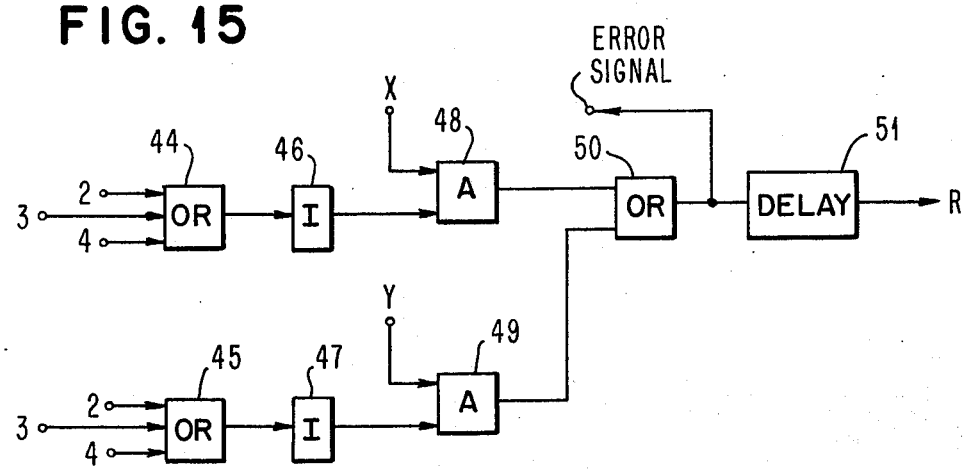
FIG. 15 illustrates the error detection logic circuit for the preferred embodiment of a decoder apparatus as shown in FIGS. 10A–10C.
Figure 4:
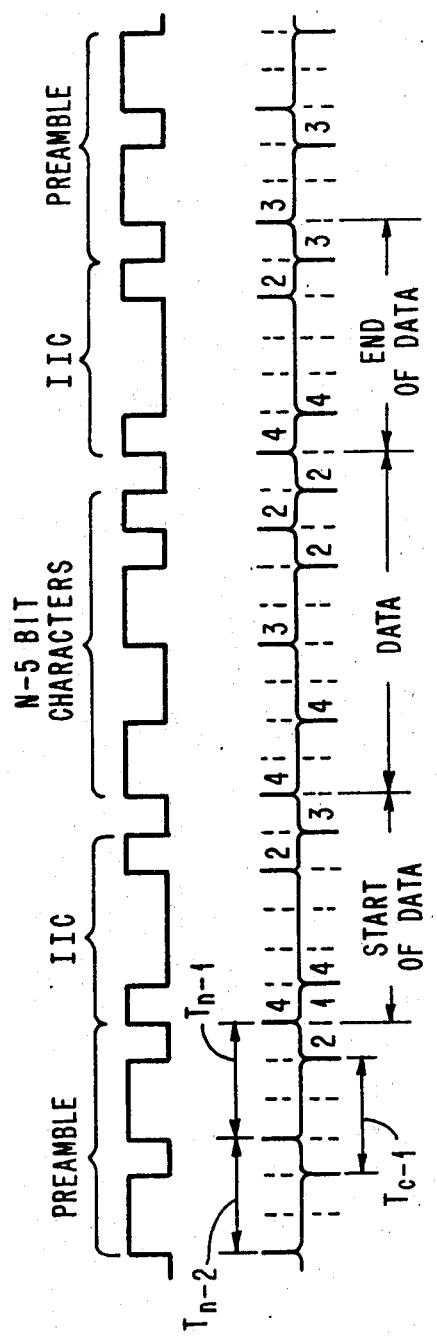
FIG. 4 illustrates a sequence of data and special characters, like those of FIG. 3, delineating the beginning and end of data, and also

Turning to FIG. 15, an additional error detection logic circuit is drawn which operates such that, if a pulse is received on the data channel or the control channel in the absence of an appropriate data pulse or control pulse search gate interval also being detected, AND gate 48 or 49 respectively, will be fully activated and, through OR gate 50, will produce the error signal output which is delayed slightly in delay unit 51 to produce a reset signal R for the system. The circuit operates by inverting the signal in an inverter 46 or 47 for this appropriate data pulse interval or control pulse interval indication applied through OR gate 44 or 45, respectively. The effect is that if a data pulse interval or control pulse interval is not indicated and an X or Y signal occurs, an error is signalled. If no X signal occurs during the time that a data pulse interval exists, the error signal produces from the output of cell 10 of shift register 23 in FIG. 10 will also be produced.

As noted earlier, the various search segments can be located in time referenced to the last occurrence of a data pulse or a control pulse, but this introduces a sensitivity to spread distortion, should a non-like pulse acquition occur. The preferred embodiment illustrated in FIGS. 10A–10C utilizes separate search window segments located or spaced in time from the last occurrence of the like polarity pulse. That is, if data pulses are positive going, for example, the search segment windows for the next data pulse, a positive pulse, will be positioned relative to the last positive pulse. Similarly, if control pulses are negative going, they will be positioned in time relative to the last occurrence of a negative going pulse.

An entire circuit for processing negative going control pulses identical to that illustrated for the positive going pulses in FIGS. 10A through 10C was mentioned as being required in the preferred embodiment, but was not illustrated since it is identical to that shown. A system can be constructed, as will be detailed shortly, which positions the search segments in time relative to the last occurrence of either a data pulse or a control pulse, and an example will be given of a system which positions the search segments in time relative to the last data pulse only.

A considerable savings in logic and other circuitry may be brought about in this fashion, since the entire processing circuit for the timing of separate search segments for the control window, which would be essentially duplication of all of FIGS. 10A through 10C for the control pulse system, can be eliminated.

Figure 17:
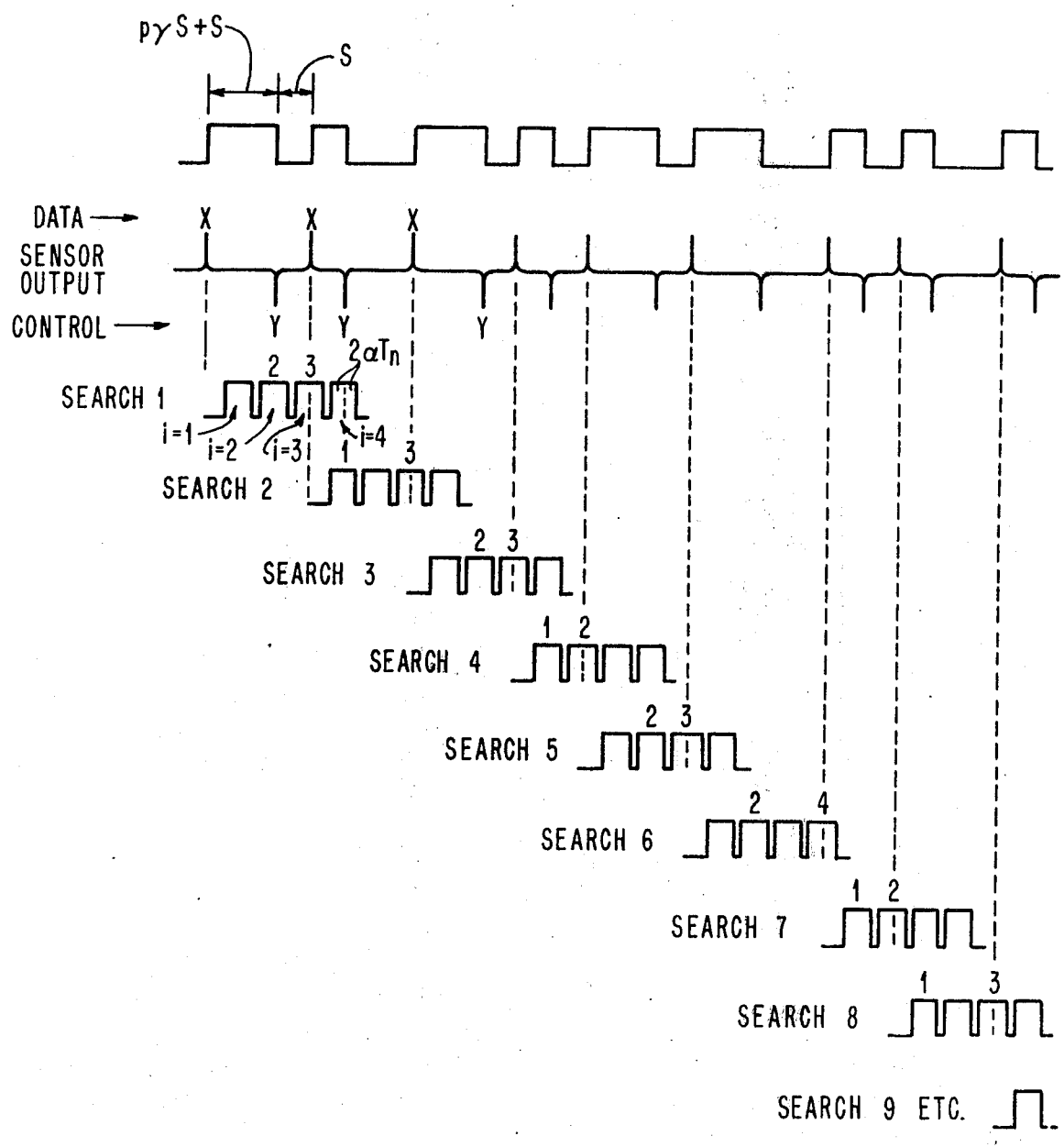
FIG. 17 illustrates the method of operation of the generic technique for the second preferred embodiment of FIG. 16.

Turning to FIG. 17, a graphical representation of the technique is illustrated. In FIG. 17, let the top line be a series of arbitrary code bars having a minimum width S and a general width larger than S identified as $S + P\gamma S$ in width. This is a two-width code of the most general type and P and $\gamma$ can be specified as is desired. Let the positive-going or leading edge signals be identified as data signals, arbitrarily, and the negative-going or trailing edge signals be identified as control signals. The data signals can be further defined as the X pulses, as was done for the description of the preferred embodiment in FIG. 10, and the control pulses may be identified as the Y pulses.

The second line of FIG. 17 shows the sensor output in the form of narrow pulses in the X and Y channels. Positioned in time below the sensor output line in FIG. 17 are series of search segment windows produced at points measured from the last occurrence of an X pulse. It may be seen that the windows have a total width $2\alpha T_n$ as was previously described. $T_n$ is understood as the last interval between two like polarity pulses, in this case X pulses. The general formula for positioning the search windows is that listed in Table I and either a zero velocity correction, a first order velocity correction, or a second order velocity correction could be made.

For the code illustrated, P can be defined as equal to 1 so that there are two different widths used in constructing the code, and $\gamma$ can have any specified value; in this case, it was drawn equal to $\gamma = 1$ for simplicity. The various possible locations of valid pulses in time following the last occurrence of an X pulse can be utilized to generate the search segment windows for the first search identified as search 1 in the line that follows beneath the sensor output line in FIG. 17.

It may be clearly seen from the first set of search windows that valid data pulse locations will occur in the second, third, or fourth window, but not in the first window. This is also clear from the basic notion that there are $2P+1$ possible valid locations for control or data pulses. It will also be observed that a control pulse may occur in the first window, which would be identified as the $i=0$ index location in the general formulas of Table I. It is possible that a control pulse may occur before the first possible location in which a data pulse can occur because the control and data pulses are interleaved in a one-for-one basis and, following the last occurrence of a data pulse, the first pulse that must be encountered will be a control pulse.

It follows that there exist a total of $2P+2$ total search segments in which data and control pulses must both fall. All segments having an index number less than or equal to P will strictly contain control pulses only. That is, the first possible search segment at the $i=0$ position, and any following segments on up to the segment having a number index equal to or less than P, can contain only possible valid control pulses, since the first possible valid data pulse location occurs only at the $i=1$ and greater position for a code in which P is 1 or greater.

For the segment having an index number of $P+1$, either control or data pulses can occur, but not both. All of the intervals having an index number greater than $P+1$ and less than the maximum $2P+2$ are possible locations for data pulses only. If a pulse or event is found at the $P+1$ index location and no event is found in an interval at a position greater than $P+1$, then it must be a data event that has been found in the P+1 location, and therefore, the control event or pulse must have occurred in an earlier interval at less than or equal to P. If no event occurred at an earlier interval, there has been no control pulse found and an error has occurred. Hence, the potential ambiguity in having a single location at which either a data pulse or a control pulse could occur at the index position having number equal to P+1, is not a problem since it is known that both a control and a data pulse cannot occur within the same segment and it is known that control pulses must precede data pulses in time where the windows are being positioned relative to the last data pulse.

In FIG. 17, it should be understood that once both a control and a data pulse have been found, further search segments are eliminated and the next search is begun based on new projections from the last or just sensed data pulse. Hence, the overlapping illustrated between the last segment in search 1 and the first segment in search 2 does not actually occur in the system as constructed.

In FIG. 17, small numbers are written inside the various search segments to identify the segments at which data and control pulses would be sensed. In search line 1, for example, a control pulse is found in the second segment and a data pulse is found in the third segment. In search line 2 a control pulse is found in the first window or segment and a data pulse is found in the third and so on.

Turning to FIGS. 18A through 18E, decode matrices for various code schemes which might be decoded using the method illustrated in FIG. 17 are shown. In FIG. 18A, decode matrices for the F2F code are shown. Two different matrices exist since, at the 1–3 CPI-DPI intervals and the 2–3 CPI-DPI intervals for the F2F code, a choice must be made as to whether to represent a 1, 0 data output for the 1–3 CPI-DPI interval or a 0, 1 output for the 2–3 CPI-DPI interval. The choices are arbitrary, but the appropriate matrix number 1 or number 2 in FIGS. 18A or 18B would be built into the decode logic such as that shown in FIG. 13A.

In FIG. 18C, the decode matrix for the S2S code is shown, where S is defined as the width of a slot written to express the digital 1, and 2S is the width of a bar or space written to express a digital 0.

FIG. 18D illustrates the decode matrix for a delta distance code in which the decode operation is conducted on the basis that if the same length bar or space as the preceding one is found, a 1 is decoded and if a different length space than the preceding one is found, a 0 is decoded. Because of this characteristic of the delta distance code, an ambiguity exists for each possible pulse interval location. The matrix of values indicates that an A or a B output state is chosen for each of the possible CPI-DPI interval sequences at which data and control pulses might occur. A command function setting a specific command to set the latch which would control the output of whichever of the two possibilities is selected is also incorporated into each box that has data bits associated with it in the matrix.

The system would be set initially to commence the decoding using the values in the matrix of FIG. 18C for example, by beginning with state A. A particular value such as a 2–3 CPI-DPI would therefore output a digital value 00 and would create a command function shown to the right of the 00 in the appropriate box to set the latch for controlling the next output as being a B state. If the next interval found happened to be a 1–3 CPI-DPI interval, the output for the B state in the appropriate box, in this case a 0—0 output, would be sent to the registers and a B state indication command would also be produced. The circuitry would be essentially similar to that in FIG. 13A, with minor modifications incorporated to change its state back and forth from state A to state B as was done in FIG. 13A previously.

It will be observed that the matrices in FIG. 18A through 18D are only a two by three matrix instead of three by three matrices as were illustrated in FIGS. 2A through 2E. A savings in logic is therefore inherent in the technique illustrated in FIG. 17 which leads to these matrices for the decode operation, since the logic need not be as extensive to contain six possible output code combinations instead of nine. An even greater savings is inherent in a system for decoding the code of FIG. 18E since only a single pulse between the cell boundaries need be decoded.

FIG. 18E illustrates the decode matrix for a ⅓–⅔ bar code. This is a particularly advantageous code for single channel decoding since the intervals for DPI (or CPI as the code is written as space + bar instead of bar + space) are always 3. This is the result of the particular code scheme, which is usually optically printed, which begins each bit cell with a printed black bar of ⅓ or ⅔ cell width. (The converse is true if each cell begins with a space.) As this rule is not violated, the leading to leading (DPI) interval will always be 3 units of widths (or slots). The decode matrix shows this and clearly indicates that the DPI need not be used at all to decode such a code stream (unless it is used just for clocking error detection or synchronizing). Instead, one need only find the CPI to instantly decode such a code scheme, i.e., only the signals between the cell boundaries need be used to decode the data.

Figure 16:
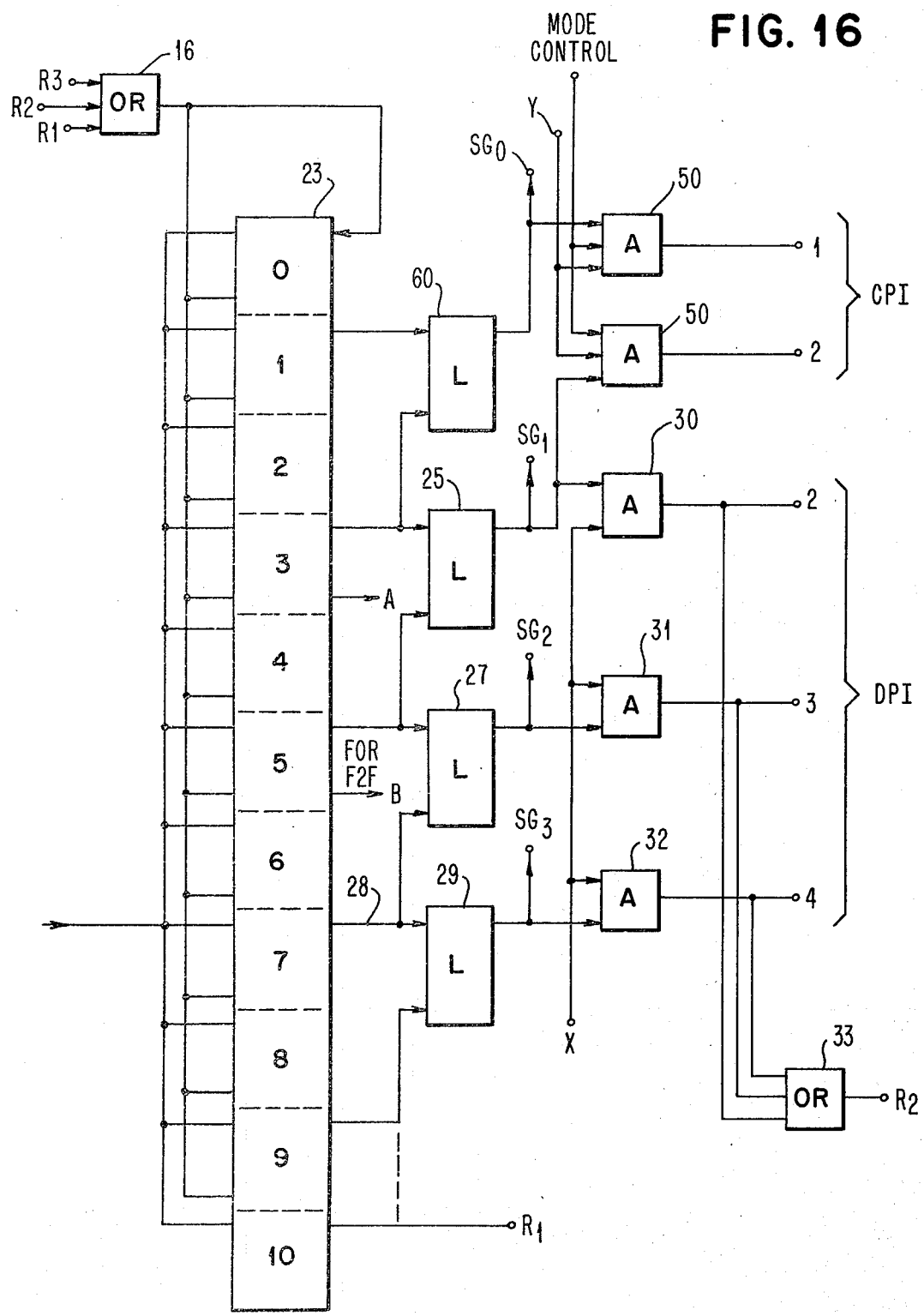
FIG. 16 illustrates another preferred embodiment of the invention as a modification of the portion of the system illustrated in FIG. 10C.

FIG. 16 illustrates the portion of the logic diagram which will be utilized in place of FIG. 10C if one wishes to implement the basic technique described with relation to FIG. 17. In other words, FIG. 16 is meant to replace FIG. 10C whenever the system is to be configured for positioning search segments relative to the last occurrence of a data pulse or a control pulse. No other changes would be required in FIG. 10 to build a complete working system. The additional set of circuitry for the Y pulses, as would have been required for the system in FIG. 10 as described, is no longer needed.

A mode control is incorporated in FIG. 16 such that, when no signal is present to activate the mode control, the system will operate exactly as the remainder of the system in FIG. 10C. In other words, AND gates 50 will not be enabled and no CPI interval indications will be produced when the mode control is not activated. When the mode control is activated, the system is automatically configured to perform the technique illustrated for FIG. 17.

If the system method of FIG. 17 were implemented based on positioning the search segments relative to the last control pulse occurrence, the decode matrices are all that would have to be changed. The decode matrices of FIGS. 18A–18C, would be changed to show data pulse intervals of 1, 2 or 3 units as possible and control pulse intervals at position 3 and 4 would be possible, the data content of the matrices would, however, remain the same. For the matrix of FIG. 18E, a change is needed since the constant DPI=3 contains no data significance and it would not be used for decoding purposes. That means that the CPI's of 2, 3, 4 would simply be renumbered as 1 or 2 since, if the search segments were positioned by relation to the cell boundaries, (a technique which is subject to print spread) the data pulse between the boundaries can occur at only segment 1 or 2. It is preferable, however, to measure of segments relative to the last signal pulse of like type in order to avoid print spread sensitivity, and this leads to possible location interval segments of 2, 3 or 4 units as shown in FIG. 18E.

With reference to FIGS. 10C and 16, a modification for implementing symbol boundary search decoding or center pulse decoding of an F2F code are shown. With particular regard to FIG. 16, latch 60 can provide the timing of the necessary search segment to isolate the center pulse of an F2F bit cell. Latches 25, 27 and 29 and their associated circuitry would not be used for such an embodiment.

The output from latch 25, however, can provide the timing of the necessary search segments for isolating the symbol boundary pulses in an F2F cell.

Lines A and B are error detection signals for the center pulse and symbol boundary pulse, respectively, and would occur at the end of each search gate, respectively, to be used if desired.

ADVANTAGES

Several advantages are immediately apparent from the nature of the method and apparatus described thus far. Firstly, the method itself is universal in that it can effectively read or decode any known multiple width self-clocking bar code, whether the code events be optic, magnetic, or electric.

Secondly, for the method and apparatus involved, no complex calculations for implementation or complex hardware are involved and the system is relatively inexpensive, fast, and reliable to build and operate.

A third advantage resides in the nature of the predictive segmented search technique in detecting, instantaneously at the time a pulse is received, the code content of the combination of bars just read.

Fourthly, the predictive search segment technique described instantaneously identifies errors that result from missing or lost pulses, and this occurs at the bit level.

Fifthly, the system requires, in the present embodiment and for the technique described, a minimum of preamble or synchronizing information. One or two bits ordinarily suffice for even the highest velocity variation system, and a fixed reference without preamble bits can also be used.

Sixthly, by the result of the predictive search segmenting technique which detects the data content on the logical basis or eqivalent of a table look-up in a matrix whose coordinates are the control pulse and data pulse intervals detected, the reading technique itself is, therefor, independent of the code and is based only on the bar widths or pulse spacings actually received. The data content may be interpreted from the bar widths which are sensed according to an arbitrary definition of what lies within the coordinates of the logical matrix thus generated by the control and data pulse intervals actually detected.

While the invention has been shown and described with reference to several preferred embodiments thereof, it will be understood by those of skill in the art that various changes in form and detail may be made therein without departing from the spirit and scope of the invention.

What is claimed is:

1. A method of decoding the encoded informational contents of a series of separately spaced apart, machine-dectectable, electrically manifested signals of first and second machine-identifiable types, said series of signals being encoded in accordance with any self-clocking encoding scheme whose elemental physical and informational characteristics have been provided to a decoder apparatus, said method comprising steps performed by said apparatus, when said series of signals is connected thereto, of:
  a. detecting a signal of either of said types;
  b. segmenting the time subsequent to the last said detected signal into separate and identifiable segments, each segment being of controlled length and being located, relative to said last detected signal, to span only one valid potential location of another of said signals;
  c. detecting, within different ones of said separate and identifiable segments, one each of said first and second types of signals; and
  d. decoding the encoded information contents of the portion of said series of signals bounded by said last two detected signals of like type by controlling a selection of informational contents from among said provided characteristics, said controlling being performed in response to the identifications of said identifiable segments within which said last two detected signals were detected; and
  e. repeating the process from step (b) until all of said series of signals has been decoded.

2. The method as described in claim 1, wherein said segmenting step comprises:
  controlling the number, length and location of said segments in response to said elemental physical characteristics of said provided code scheme and in proportion to a fixed reference length of time.

3. The method as described in claim 2, wherein said controlling step is further governed by the formula:

$$T_{n\,(i,j,\gamma)} = T_{r\,(j,\gamma)} [B_{(i,j,\gamma)} \pm \alpha_{(i,j,\gamma)}]$$

in which: $T_{n\,(i,j,\gamma)}$ is the nominal location, measured from said last detected signal of said type, at which a valid next signal of the same type may potentially occur, $T_{r\,(j,\gamma)}$ is said fixed reference length and is equal to $T_0 \times R_{(j,\gamma)}$, where $T_0$ is 2S, $R_{(j,\gamma)}$ is $(2-\gamma) + j\gamma/2$ and, $B_{(i,j,\gamma)}$ equals $2 + (i-1)\gamma/(2-\gamma) + j\gamma$, which is a signal spacing position factor defined by said provided elemental physical characteristics of said code scheme, and in which $i$ and $j$ are integers lying in the range $0 \leq i,j \leq m$, where $m$ is the maximum number of combined width intervals which can be constructed from the different physical width elements utilized in constructing said code scheme, $\gamma$ is a width variation factor defined as $$\gamma = \frac{\Delta W}{S},$$

where $\Delta W$ is the minimum difference in width used in constructing said code scheme, and S is the minimum width used in constructing said code scheme, and wherein $\alpha_{(i,j,\gamma)}$ is a segment length factor defined as $$\alpha_{(i,j,\gamma)} = \frac{\gamma}{4},$$

and *j* is the integer which is the identification number of the segment which defines the lenth of said reference length $T_{R(j,\gamma)}$.

4. A method of decoding the encoded informational contents of a series of separately spaced apart, machine-detectable, electrically manifested signals of first and second machine-identifiable types, said series of signals being encoded in accordance with any self-clocking encoding scheme whose elemental physical and informational characteristics have been provided to a decoder apparatus, said method comprising steps performed by said apparatus, when said series of signals is connected thereto, of:
   a. detecting two successive like type signals;
   b. segmenting the time for detecting any signals subsequent to the last said detected signal into separate and identifiable segments, each segment being of controlled length and being located, relative to said last detected signal, to span only one valid potential location of another of said signals of either type;
   c. detecting, within different ones of said separate and identifiable segments, one each of said first and second types of signals; and
   d. decoding the encoded information contents of the portion of said series of signals bounded by said last two detected signals of like type by controlling a selection of informational contents from among said provided characteristics, said controlling being performed in response to the identifications of said segments within which said last two detected signals were detected; and
   e. repeating the process from step (b) until all of said series of signals has been decoded.

5. The method as described in claim 4, wherein said segmenting step comprises:
controlling the number, length and location of said segments in response to said elemental physical characteristics of said provided code scheme and in proportion to the interval of time lying between said last two detected signals of said like type.

6. The method as described in claim 4, wherein said controlling step is further governed by the formula:

$$T_{n(i,j,\gamma)} = T_{n-1(j,\gamma)} [B_{(i,j,\gamma)} \pm \alpha_{(j,\gamma)}]$$

where: $T_{n-1}$ is defined as the last encountered length $T_n$ and $T_{n-1(j,\gamma)} = T_{n-1} \times R_{(j,\gamma)}$, and where $R_{(i,\gamma)}$ is $(2-\gamma) + j\gamma/2$ and, $B_{(i,j,\gamma)}$ is $2 + (i-1)\gamma/(2-\gamma) + j\gamma$, which is a signal spacing position factor defined by said provided elemental physical characteristics of said code scheme, and in which *i* and *j* are integers lying in the range $0 \leq i,j \leq m$, where *m* is the maximum number of combined width intervals which can be constructed from the different physical width elements utilized in constructing said code scheme, $\gamma$ is a width variation factor defined as $$\gamma = \frac{\Delta W}{S},$$

where $\Delta W$ is the minimum difference in width used in constructing said code scheme, and S is the minimum width used in constructing said code scheme, and wherein $\alpha_{(j,\gamma)}$ is a segment length factor defined as $$\alpha\alpha_{(j,\gamma)} = \frac{\gamma}{4},$$

and *j* is the integer which is the identification number of the segment which contains the terminal end of said last encountered length $T_n$.

7. A method of decoding the encoded informational contents of a series of separately spaced apart, machine-detectable, electrically manifested signals of first and second machine-identifiable types, said series of signals being encoded in accordance with any self-clocking encoding scheme whose elemental physical and informational characteristics have been provided to a decoder apparatus, said method comprising steps performed by said apparatus, when said series of signals is connected thereto, of:
   a. detecting three successive signals of either of said types;
   b. segmenting the time subsequent to the last said detected signal of either said type into separate and identifiable segments, each segment being of controlled length and being located relative to said last detected signal of said type to span only one valid possible location of another of said signals of either of said types;
   c. detecting, within different ones of said separate and identifiable segements, one each of said first and second types of signals; and
   d. decoding the encoded information contents of the portion of said series of signals bounded by said last two detected signals of like type by controlling a selection of informational contents from among said provided characteristics, said controlling being performed in response to the identifications of said segments within which said last two detected signals of unlike type were detected; and
   e. repeating the process from step (b) until all of the series of signals has been decoded.

8. The method as described in claim 7, wherein said segmenting step comprises:
controlling the number, length and location of said segments in response to said elemental physical characteristics of said provided code scheme and in proportion to the separate intervals lying between each two of said last three detected signals of like type.

9. The method as described in claim 7, wherein said controlling step is further governed by the formula:

$$T_{n(i,j,\gamma)} = T_{n-1(j,\gamma)} [1-A(1 - \frac{T_{n-1(j,\gamma)}}{T_{n-2(j,\gamma)}}) [B_{(i,j,\gamma)} \pm \alpha_{(j,\gamma)}]$$

where: $T_{n-1}$ is defined as the last encountered length $T_n$ and $T_{n-1(j,\gamma)} = T_{n-1} \times R_{(j,\gamma)}$, $T_{n-2}$ is defined as the next to last encountered length $T_n$ and $T_{n-2(j,\gamma)} = T_{n-2} \times R_{(j,\gamma)}$, and where $R_{(j,\gamma)}$ is $(2-\gamma) + j\gamma/2$, $B_{(i,j,\gamma)}$ is $2 + (i-1)\gamma(2-\gamma) + j\gamma$, *i* and *j* are integers lying in the range $0 \leq i,j \leq m$, where *m* is the maximum number of combined width intervals which can be constructed from the different physical width elements utilized in constructing said code scheme, $\gamma$ is a width variation factor defined as $$\gamma = \frac{\Delta W}{S},$$

where $\Delta W$ is the mimimum difference in width used in constructing said code scheme, and wherein $\alpha_{(j, \gamma)}$ is a segment length factor defined as $$\alpha_{(j, \gamma)} = \frac{\gamma}{4},$$

and $j$ is the integer which is the identification number of the segment which contains the terminal end of said last encountered length $T_n$, and A is an arbitrary constant chosen from the range $0 \leq A \leq 1$.

10. Apparatus for decoding the encoded data content of a stream of self-clocking encoded, machine-sensible, electrically manifested signals, comprising:
   signal pulse detection means connected to receive said stream of encoded data signals for detecting and indicating the occurrence of a data signal in said stream;
   clock means for generating electrical pulses at a fixed frequency;
   a plurality of independent first counting means connected to said clock means for counting pulses at different multiples of said fixed frequency;
   count selection and gating means connected to said plurality of first counters for gating one of the counts in one of said first counters to a register;
   register means connected to said selection and gating means for storing said selected first count;
   second counter means connected to said register means for counting off said first count multiple times;
   third counter means connected to said second counter means for counting the number of times that said second counter means counts off said selected first count;
   coincidence detection means connected to said third counter and to said detection means for indicating the coincidence of a signal pulse in said stream occurring during the interval of time lying between one of said multiples of said selected first count and another of said multiples;
   control means connected to said count selection and gating means and to said detection means and to said third counter means for controlling the selection and gating of the contents of one of said first counters at the coincidence of one of said multiple counts and a signal occurrence detected by said detection means; and
   means connected to said coincidence detection means for indicating the data content of the portion of said signal stream bounded by the occurrence of a coincidence detection and the last such occurrence of a coincidence detection, said data indication being in correspondence with and in response to the number of said multiples of said first count at which said coincidence detection occurred.

11. Apparatus as described in claimd 10, wherein:
said different multiples of said fixed frequency are defined by the equation $$F = \frac{f_0 \times \alpha}{R_n},$$

where $f_0$ is said fixed frequency, $\alpha$ is a variable defined by the physical characteristics of said encoded data format and which is defined as equal to $\gamma/4$, where $\gamma$ is further defined as equal to $\Delta W/S$, where $\Delta W$ is the minimum difference in width between two interval lengths used in constructing the code format and S is the minimum width between intervals used in constructing said code format, and $R_{(j, \eta)}$ is defined as $(2-\gamma) + j\gamma/2$, where $i$ is an integer lying in the range $0 \leq j \leq m$, and $m$ is the maximum number of combined width intervals which can be constructed from the different physical width elements utilized in constructing said code scheme, and $j$ is the integer which is the identification number that defines the length of one of said intervals utilized as a reference, and $n$ is a specific integer $j$ selected from the range of $j$.

12. Apparatus for decoding the data contents of a stream of self-clocking encoded, machine-sensible, electrically manifested signals of first and second machine identifiable types, respectively, comprising:
   pulse detection means, connected to receive said stream of encoded signals, for detecting and indicating separately the occurrence of each of said first and second types of signals in said stream;
   clock means for generating signal pulses at a fixed frequency;
   two pluralities of independent first counter means connected to said clock for counting pulses at different multiples of said fixed frequency, one of said pluralities of said first counters being dedicated for processing said first type of data signals and the other plurality of said first counter being dedicated for the processing of said second type of data signals;
   two count selection and gating means connected, respectively, to said two pluralities of first counters for gating the contents of one of the counts in each of said pluralitites of first counters to registers;
   two registers connected to said two selection and gating means for individually storing the selected contents of said two pluralities of first counter means;
   two second counter means connected to said two register means for counting off the first count contained therein multiple times;
   two third counter means connected individually to said two second counter means for counting off the number of times said two second counter means count off said selected first count;
   two independent coincidence detection means connected to said two third counter means and to said detection means for indicating the coincidences of each type of signal in said data stream occurring between one of said multiple counts of said selected first count and another multiple of said count;
   two control means connected individually to said two count selection and gating means and to said detection means and to said two third counter means, respectively, for controlling the selection and gating of the contents of one each of said two pluralities of first counters at the coincidence of one each of said signal types and one each of said multiple count; and
   means connected to said two coincidence detection means for indicating the data contents of the portion of said signal stream bounded by the occurrence of two said signal pulses of like type, said indication being in correspondence with the numbers of said multiples of said first count at which said two coincidence detections occurred.

13. Apparatus as described in claim 12, wherein:
said different multiples of said fixed frequency are defined by the equation $$F = \frac{f_0 \times \alpha}{R_n},$$

where $f_0$ is said fixed frequency, $\alpha$ is a variable defined by the physical characteristics of said encoded data format and which is defined as equal to $\gamma/4$, where $\gamma$ is further defined as equal to $\Delta W/S$, where $\Delta W$ is the minimum difference in width between two interval lengths used in constructing the code format and S is the minimum width between intervals used in constructing said code format, and $R_{(j,\gamma)}$ is defined as $(2-\gamma)+j\gamma/2$, where $i$ is an integer lying in the range $0 \le j \le m$, and $m$ is the maximum number of combined width intervals which can be constructed from the different physical width elements utilized in constructing said code scheme, and $j$ is the integer which is the identification number that defines the length of one of said intervals utilized as a reference, and $n$ is a specific integer $j$ selected from the range of $j$.

14. A method of decoding the encoded informational contents of a series of separately spaced apart, machine-detectable, electrically manifested signals of first and second machine-identifiable types, said series of signals being encoded in accordance with any self-clocking encoding scheme whose elemental physical and informational characteristics have been provided to a decoder apparatus, said method comprising steps performed by said apparatus, when said series of signals is connected thereto, of:
 a. detecting a signal of one of said types;
 b. segmenting the time subsequent to the last detection of a said signal into separate and identifiable segments, each segment being of controlled length and being located relative to said last detected signal to span only one valid potential location of another of said same type of signals;
 c. detecting a signal of the other said type opposite in type to that last said detected signal;
 d. segmenting the time subsequent to the detection of said signal of other type into separate and identifiable segments, each segment being of controlled length and being located, relative to said detected signal of other type, to span only one valid potential location of another of said signals of other type;
 e. detecting, within different ones of said separate and identifiable segments, one each of said first and second types of signals; and
 f. decoding the encoded informational contents of the portion of said series of signals bounded by said last two detected signals of said other type by controlling a selection of informational content from among said provided characteristics, said controlling being performed in response to the identifications of said segments within which said last two signals of unlike type were detected; and
 g. repeating the process from step (b) until all of said series of signals have been decoded.

15. The method as described in claim 14, wherein said segmenting step comprises:
controlling the number, length and location of said segments in response to said elemental physical characteristics of said provided code scheme and in proportion to a fixed reference length of time.

16. The method as described in claim 15, wherein said controlling step is further governed by the formula:

$$T_n(i,j,\gamma) = T_r(j,\gamma) [B_{(i,j,\gamma)} \pm \alpha_{(j,\gamma)}]$$

in which: $T_n(i,j,\gamma)$ is the nominal location, measured from said last detected signal of said type, at which a valid next signal of the same type may potentially occur, $T_r(j,\gamma)$ is said fixed reference length and is equal to $T_0 \times R_{(j,\gamma)}$, where $T_0$ is $2S$, $R_{(j,\gamma)}$ is $(2-\gamma)+j\gamma/2$ and, $B_{(i,j,\gamma)}$ equals $2+(i-1)\gamma(2-\gamma)+j\gamma$, which is a signal spacing position factor defined by said provided elemental physical characteristics of said code scheme, and in which $i$ and $j$ are integers lying in the range $0 \le i,j \le m$, where $m$ is the maximum number of combined width intervals which can be constructed from the different physical width elements utilized in constructing said code scheme, $\gamma$ is a width variation factor defined as $$\gamma = \frac{\Delta W}{S},$$

where $\Delta W$ is the minimum difference in width used in constructing said code scheme, and S is the minimum width used in constructing said code scheme, and wherein $\alpha_{(j,\gamma)}$ is a segment length factor defined as $$\alpha_{(j,\gamma)} = \frac{\gamma}{4},$$

and $j$ is the integer which is the identification number of the segment which defines the length of said reference length $T_r(j,\gamma)$.

17. A method of decoding the encoded informational contents of a series of separately spaced apart, machine-detectable, electrically manifested signals of first and second machine-identifiable types, said series of signals being encoded in accordance with any self-clocking encoding scheme whose elemental physical and informational characteristics have been provided to a decoder apparatus, said method comprising steps performed by said apparatus, when said series of signals is connected thereto, of:
 a. detecting two successive like type signals of either of said types and detecting one of said signals of said other type located between said two successive like type signals;
 b. segmenting the time subsequent to the last said detected signal into separate and identifiable segments, each segment being of controlled length and being located, relative to said last detected signal, to span only one valid potential location of another of said signals of said same type;
 c. detecting one more said signal of said other type;
 d. segmenting the time subsequent to the last said detected signal of said other type into separate and identifiable segments, each segment being of controlled length and being located, relative to said last detected signal of said other type, to span only one valid potential location of another of said signals of said other type;

e. detecting, within different ones of said separate and identifiable segments, one each of said first and second types of signals; and f. decoding the encoded information contents of the portion of said series of signals bounded by said last two detected signals of like type by controlling a selection of informational contents from among said provided characteristics, said controlling being performed in response to the identifications of said segments within which said last two detected signals of unlike type were detected; and g. repeating the process from step (b) until all of said series of signals have been decoded.

18. The method as described in claim 17, wherein said segmenting step comprises:

controlling the number, length and location of said segments in response to said elemental physical characteristics of said provided code scheme and in proportion to the interval of time lying between said last two detected signals of said like type.

19. The method as described in claim 17, wherein said controlling step is further governed by the formula:

$$T_n(i,j,\gamma) = T_{n-1}(j,\gamma) [B_{(i,j,\gamma)} \pm \alpha_{(j,\gamma)}]$$

where: $T_{n-1}$ is defined as the last encountered length $T_n$ and $T_{n-1(j,\gamma)} = T_{n-1} \times R_{(j,\gamma)}$, and where $R_{(j,\gamma)}$ is $(2-\gamma) + j\gamma/2$ and, $B_{(i,j,\gamma)}$ is $2 + (i-1)\gamma/(2-\gamma) + j\gamma$, which is a signal spacing position factor defined by said provided elemental physical characteristics of said code scheme, and in which $i$ and $j$ are integers lying in the range $0 \leq i,j \leq m$, where $m$ is the maximum number of combined width intervals which can be constructed from the different physical width elements utilized in constructing said code scheme, $\gamma$ is a width variation factor defined as $$\gamma = \frac{\Delta W}{S},$$

where $\Delta W$ is the minimum difference in width used in constructing said code scheme, and S is the minimum width used in constructing said code scheme, and wherein $\alpha_{(j,\gamma)}$ is a segment length factor defined as $$\alpha_{(j,\gamma)} = \frac{\gamma}{4},$$

and $j$ is the integer which is the identification number of the segment which contains the terminal end of said last encountered length $T_n$.

20. A method of decoding the encoded informational contents of a series of separately spaced apart, machine-detectable, electrically manifested signals of first and second machine-identifiable types, said series of signals being encoded in accordance with any self-clocking encoding scheme whose elemental physical and informational characteristics have been provided to a decoder apparatus, said method comprising steps performed by said apparatus, when said series of signals is connected thereto, of:

a. detecting three like signals of either of said types and three like signals of the other of said types interspersed with said three signals of said either type on a one-for-one basis;

b. segmenting the time subsequent to the last said detected signal of said either type into separate and identifiable segments, each segment being of controlled length and being located, relative to said last detected signal of said type, to span only one valid potential location of another of said signals of said either type;

c. segmenting the time subsequent to said last detected signal of said other type into separate and identifiable segments, each segment being of controlled length and being located, relative to said last detected signal of said other type, to span only one valid potential location of another of said signals of said other type;

d. detecting, within different ones of said separate and identifiable segments, one each of said first and second types of signals; and e. decoding the encoded information contents of the portion of said series of signals bounded by said last two detected signals of like type by controlling the selection of information contents from among said provided characteristics, said controlling being performed in response to the identifications of said segments within which said last two detected signals of unlike type were detected; and f. repeating the process from step (b) until all of said series of signals has been decoded.

21. The method as described in claim 20, wherein said segmenting step comprises:

controlling the number, length and location of said segments in response to said elemental physical characteristics of said provided code scheme and in proportion to the separate intervals lying between each two of said last three detected signals of like type.

22. The method as described in claim 20, wherein said controlling step is further governed by the formula:

$$T_n(i,j,\gamma) = T_{n-1}(j,\gamma) [1-A(1 - \frac{T_{n-1(j,\gamma)}}{T_{n-2}(j,\gamma)})[B_{(i,j,\gamma)} \pm \alpha_{(j,\gamma)}]$$

where: $T_{n-1}$ is defined as the last encountered length $T_n$ and $T_{n-1(j,\gamma)} = T_{n-1} \times R_{(j,\gamma)}$, $T_{n-2}$ is defined as the next to last encountered length $T_n$ and $T_{n-2}(j,\gamma) = T_{n-2} \times R_{(j,\gamma)}$, and where $R_{(j,\gamma)}$ is $(2-\gamma) + j\gamma/2$, $B_{(i,j,\gamma)}$ is $2 + (i-1)\gamma/(2-\gamma) + j\gamma$, $i$ and $j$ are integers lying in the range $0 \leq i,j \leq m$, where $m$ is the maximum number of combined width intervals which can be constructed from the different physical width elements utilized in constructing said code scheme, $\gamma$ is a width variation factor defined as $$\gamma = \frac{\Delta W}{S},$$

where $\Delta W$ is the minimum difference in width used in constructing said code scheme, and wherein $\alpha_{(j,\gamma)}$ is a segment length factor defined as $$\alpha_{(j,\gamma)} = \frac{\gamma}{4},$$

and *j* is the integer which is the identification number of the segment which contains the terminal end of said last encountered length $T_n$, and A is an arbitrary constant chosen from the range $0 \leq A \leq 1$.

23. A method of decoding the encoded informational contents of a series of separately spaced apart, machine-detectable, electrically manifested signals of first and second machine-identifiable types occurring at cell boundaries and between cell boundaries, respectively, said series of signals being encoded in accordance with any self-clocking encoding scheme which uses a constant cell width but varies the width of a bar used in combination with a space, and whose elemental physical and informational characteristics have been provided to a decoder apparatus, said method comprising steps performed by said apparatus, when said series of signals is connected thereto, of:

a. detecting a signal of the type occurring between the cell boundaries;

b. segmenting the time subsequent to the last said detected signal into separate and identifiable segments, each segment being of controlled length and being located, relative to said last detected signal, to span only one valid potential location of another of said signals;

c. detecting, within one of said separate and identifiable segments, one of said signals; and d. decoding the encoded information content of the portion of said series of signals bounded by said last two detected signals of like type by controlling a selection of informational contents from among said provided characteristic, said controlling being performed in response to the identification of said identifiable segment within which said last detected signal was detected; and e. repeating the process from step (b) until all of said series of signals has been decoded.

* * * * *

UNITED STATES PATENT OFFICE
CERTIFICATE OF CORRECTION

Patent No. 3,978,319  Dated August 31, 1976

Inventor(s) Albert Watson Vinal

It is certified that error appears in the above-identified patent and that said Letters Patent are hereby corrected as shown below:

Claim 3, Column 37, Line 2, "length" is misspelled;

Claim 6, Column 38, Line 5, the formula should be:

$$\alpha_{(j,\gamma)} = \frac{\gamma}{4},$$

Claim 11, Column 39, Line 60, "claimed" is misspelled;

Claim 16, Column 42, Line 19, after "equals" the formula should be $$\frac{2 + (i-1)\gamma}{(2-\gamma) + j\gamma},$$

Signed and Sealed this

Twelfth Day of April 1977

[SEAL]

Attest:

RUTH C. MASON  
Attesting Officer

C. MARSHALL DANN  
Commissioner of Patents and Trademarks